(12) United States Patent
Gao et al.

(10) Patent No.: US 8,275,168 B2
(45) Date of Patent: Sep. 25, 2012

(54) ORIENTATION FREE WATERMARKING MESSAGE DECODING FROM DOCUMENT SCANS

(75) Inventors: Chunyu Gao, Santa Clara, CA (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 600 days.

(21) Appl. No.: 12/549,842

(22) Filed: Aug. 28, 2009

(65) Prior Publication Data

US 2011/0051989 A1      Mar. 3, 2011

(51) Int. Cl.
*G06K 9/00*     (2006.01)
(52) U.S. Cl. ....................................................... 382/100
(58) Field of Classification Search ................... 382/100
See application file for complete search history.

(56) References Cited

U.S. PATENT DOCUMENTS

| | | | |
|---|---|---|---|
| 4,723,297 A | 2/1988 | Postl | |
| 5,748,344 A | 5/1998 | Rees | |
| 6,490,376 B1 | 12/2002 | Au et al. | |
| 6,574,375 B1 | 6/2003 | Cullen et al. | |
| 6,580,804 B1 * | 6/2003 | Abe | 382/100 |
| 7,006,670 B2 | 2/2006 | Sumikawa et al. | |
| 7,298,920 B2 | 11/2007 | Zuniga | |
| 7,356,200 B2 | 4/2008 | Zuniga | |
| 8,031,905 B2 * | 10/2011 | Zandifar et al. | 382/100 |
| 8,121,339 B2 * | 2/2012 | Meaney | 382/100 |
| 8,160,294 B2 * | 4/2012 | Takahashi et al. | 382/100 |
| 2007/0005977 A1 * | 1/2007 | Tohne et al. | 713/176 |
| 2007/0201099 A1 * | 8/2007 | Eguchi et al. | 358/3.28 |

* cited by examiner

*Primary Examiner* — Tom Y Lu

(57) ABSTRACT

Bit data is encoded into characters in an input image by providing different darkness levels for pixels in either half of a text character. To determine if the input image is of a right-side up document, or an upside-down document, multiple scans of the input image at 90° rotations between scans may be made. Each scan result is searched for occurrences of a indicator prefix bit-sequence. The scan that contains the indicator prefix bit-sequence is elected as the right-side up orientation for the input image. If multiple scans show occurrences of the indicator prefix bit-sequence, then the scan that has the highest number of occurrences is elected as the correct orientation. Alternatively, the number of data bits between repeated occurrences of the indicator prefix bit-sequence is compared with a predefined message bit size, and the scan that matches most closely is elected as the correct orientation.

14 Claims, 15 Drawing Sheets

Use character alignment to estimate the orientation of text lines and correct the document orientation Map of the centroids of text sites.
Each asterisk represents a text site Local peaks on the similarity measurement vector between the recovered bit stream and predefined Indicator Prefix "A" identify the starting and ending points of each encoded message "AMP"

ORIENTATION FREE WATERMARKING MESSAGE DECODING FROM DOCUMENT SCANS

BACKGROUND

The present invention pertains generally to image processing, and relates more particularly to extracting a data message embedded in an input image.

DESCRIPTION OF RELATED ART

The proliferation of computers with increasing computational power has contributed to the growth of digital image processing. Digital images can typically be copied without concern for image degradation. Digital images can also be easily modified, enhanced, and adapted to provide high-quality images that meet a wide range of application requirements. These characteristics of digital images are also sources of concern for owners of images that wish to protect copyrights in the images or that wish to detect and identify sources of unauthorized copying.

In response to these concerns, there have been attempts to develop ways to embed information into digital signals (or information), such as images, that can identify the owner of the digital signal or that can identify the device that was used to produce the digital signal or a copy thereof. In particular, there has been considerable effort to develop ways to embed authenticating information into images to enable subsequent proof of ownership or to enable source tracking for images produced on permanent media such as paper.

Some implementations embed information that is clearly visible in an image. Although such implementations make detection easy, they distort the original image. Other approaches attempt to make the embedded data more inconspicuous, but these approaches require extraction methods that are time consuming or require extensive computational effort to detect the inconspicuously embedded information. These approaches further have reliability issues when attempting to extract the inconspicuously embedded information.

This problem of embedding digital information is of particular interest in the field of image scanning and reproduction. Since it is desirable that the embedded information be inconspicuous to a human viewer of the image, the embedded information might be lost if the image is printed and then re-digitized through image scanning.

One approach toward addressing this need in scanned images is to hide visibly obscure indicators in a printed image. If an electronic detector knows the physical characteristics of the hidden indicators, it may be possible to extract the indicators from a scanned image. This approach, however, typically requires ideal scanning conditions since the electronic detector typically expects the hidden indicators to be within specific location area, have a specific orientation, or be otherwise detectable by some other predefined physical characteristic. Since a physical image may be scanned in any of a multitude of orientations, an electronic detector may have difficulty locating the hidden indicator in a scanned image.

What is needed are methods of efficiently embedding information in a printed image that does not unduly distort the printed image, but still permits reliable extraction of the embedded information when the image is scanned.

SUMMARY OF INVENTION

This objective has been met in a processing unit for recovering an embedded message within an input image. In one embodiment of the present invention, the processing unit may include: (i) an input for receiving the input image having logic data bit information encoded into characters within the input image; (ii) a site detection unit for identifying characters in the input image; (iii) a bit extraction unit for extracting logic data bit information from the characters to define a working set of logic bits; (iv) a detect bitstring unit for searching at least part of the working set of logic bits for occurrences of a predefined indicator prefix bit-sequence and if at least one occurrence of the predefined indicator prefix bit sequence is found, then identifying the working set of logic bits as a true set of logic bits, else reversing the bit order of said working set of logic bits and logically inverting each bit to create said true set of logic bits. Also included is (v) a decoding unit for converting the true set of logic bits to characters according to a predefined decoding scheme.

Optionally, the bit extracting unit may: (A) extract a first set of logic bits from the input image in the input image's original orientation; (B) extract a second set of logic bits from the input image along an orientation 90 degrees to the input image's original orientation; and (C) if the number of extracted logic bits in said first set of logic bits is greater than the number of extracted bits in said second set of logic bits, then identifies the first set of logic bits as the working set of logic bits. Otherwise, it identifies the second set of logic bits as said working set of logic bits.

In the present case, each of the characters in the input image is divided into a first part and a second part. A first logic data bit is encoded by having pixels within the first part be darker than pixels within the second part by a first predefined threshold amount, a second logic data bit is encoded by having pixels within the first part be lighter than pixels within the second part by a second threshold amount. It is to be understood that the second logic data bit is preferably the logic compliment of the first logic data bit. Under this encoding scheme, the bit extraction unit extracts logic data bit information from the characters by determining, for each character checked, if pixels within its first part are darker than pixels within its second part by the first predetermined threshold amount, or if pixels within its first part are lighter than pixels within its second part by the second threshold amount. It is preferred that the first threshold amount be equal to the second threshold amount.

Preferably in part (C) of the bit extraction unit in the present embodiment, if the number of extracted logic bits in the first set of logic bits is greater than the number of extracted bits in the second set of logic bits, then the input image's original orientation is defined as a correct orientation, else a 90 degree rotation of the input image is defined as the correct orientation.

Also preferably, the detect bitstring unit searches only the part of the working set of logic bits that corresponds to the longest line of characters within the input image. Additionally, the predefined indicator prefix bit-sequence may be unique from the remaining bit sequence in the embedded message. For example, if the embedded message includes an input message "M" consisting of only printable characters, then the predefined indicator prefix bit-sequence may include at least one non-printable character.

A second embodiment of the present provides a processing unit for recovering an embedded message within an input image, where the processing unit includes: (i) an input for receiving the input image having logic data bit information encoded into characters within the input image; (ii) a site detection unit for identifying characters within the input image; (iii) a bit extraction unit for extracting logic data bit information from the characters to define a working set of logic bits; (iv) a detect bitstring unit for: (1) conducting a first search operation on the working set of logic bits for occurrences of a predefined indicator prefix bit-sequence; (2) reversing the bit order of the working set of logic bits and logically inverting each bit to create an inverse set of logic bits; (3) conducting a second search operation on the inverse set of logic bits for occurrences of the predefined indicator prefix bit-sequence; and (4) identifying a true set of logic bits based on the results of the first and second search operations; and (v) a decoding unit for converting the true set of logic bits to characters according to a predefined decoding scheme.

In the present embodiment, the bit extracting unit of the present embodiment: (A) extracts a first set of logic bits from the input image in the input image's original orientation; (B) extracts a second set of logic bits from the input image along an orientation 90 degrees to the input image's original orientation; and (C) if the number of logic bits in the first set of logic bits is greater than the number of bits in the second set of logic bits, then identifies the first set of logic bits as the working set of logic bits, else identifies the second set of logic bits as the working set of logic bits.

Like in the previous case, in the input image, (a) each of the characters is divided into a first part and a second part; (b) a first logic data bit is encoded by having pixels within the first part be darker than pixels within the second part by a first predefined threshold amount; (c) a second logic data bit is encoded by having pixels within the first part be lighter than pixels within the second part by a second threshold amount, the second logic data bit being the logic compliment of the first logic data bit; and the bit extraction unit extracts logic data bit information from the characters by determining, for each character checked, if pixels within the first part are darker than pixels within the second part by the first predetermined threshold amount, or if pixels within the first part are lighter than pixels within the second part by the second threshold amount. Alternatively, the first threshold amount is equal to the second threshold amount.

In the present embodiment, in part (4) of the detect bitstring unit, if the number of occurrences of the predefined indicator prefix bit-sequence found in the first search operation is greater than the number of occurrences found in the second search operation, then the working set of logic bits is identified as the true set of logic bits, else the inverse set of logic bits is identified as the true set of logic bits.

In an alternate embodiment, in the detect bitstring unit, if the number of data bits between repeated occurrences of the predefined indicator prefix in the working set of logic bits matches a predefined message bit-size, then part (4) identifies the working set of logic bits as the true set of logic bits; and if the number of data bits between repeated occurrences of the predefined indicator prefix in the inverse set of logic bits match the predefined message bit-size, then part (4) identifies the inverse set of logic bits as the true set of logic bits.

Preferably, in the detect bitstring unit, the first search operation identifies a first message-length value as the number of bits between repeated occurrences of the predefined indicator prefix within the working set of logic bits; the second search operation identifies a second message-length value as the number of bits between repeated occurrences of the predefined indicator prefix within the inverse set of logic bits; and if the first message-length value is closer than the second message-length value to a predefined message bit-size, then part (4) identifies the working set of logic bits as the true set of logic bits, else part (4) identifies the inverse set of logic bits as the true set of logic bits.

It is further preferred that the predefined indicator prefix bit-sequence be unique from the remaining bit sequence in the embedded message. For example, the embedded message may includes an input message "M" consisting of only printable characters, and the predefined indicator prefix bit-sequence may include at least one non-printable character.

A third embodiment of the present invention provides a processing unit for recovering an embedded message within an input image, having: (i) an input for receiving the input image having logic data bit information encoded into characters within the input image; (ii) a site detection unit for identifying characters within the input image; and (iii) a bit extraction unit for extracting logic data bit information from the characters. The bit extracting unit preferably: (A) extracts a first set of logic bits from a 0-degree rotation of the input image; (B) extracts a second set of logic bits from a 90-degree-rotation of the input image; (C) extracts a third set of logic bits from an 180-degree-rotation of the input image; and (D) extracts a fourth set of logic bits from a 270-degree-rotation of the input image. The processing unit further includes (iv) a detect bitstring unit for (1) conducting a first search operation on the first set of logic bits to look for occurrences of a predefined indicator prefix bit-sequence; (2) optionally conducting a second search operation on the second set of logic bits to look for occurrences of the predefined indicator prefix bit-sequence; (3) optionally conducting a third search operation on the third set of logic bits to look for occurrences of the predefined indicator prefix bit-sequence; (4) optionally conducting a fourth search operation on the fourth set of logic bits for occurrences of the predefined indicator prefix bit-sequence; (5) identifying one of the first, second, third, or fourth set of logic bits as a true set of logic bits based on the result of at least one of the first, second, third, and fourth search operations. The processing unit further preferably includes (v) a decoding unit for converting the true set of logic bits to characters according to a predefined decoding scheme.

Preferably in this embodiment, in the input image, (a) each of the characters is divided into a first part and a second part; (b) a first logic data bit is encoded by having pixels within the first part be darker than pixels within the second part by a first predefined threshold amount; (c) a second logic data bit is encoded by having pixels within the first part be lighter than pixels within the second part by a second threshold amount, the second logic data bit being the logic compliment of the first logic data bit; and the bit extraction unit extracts logic data bit information from the characters by determining, for each character checked, if pixels within the first part are darker than pixels within the second part by the first predetermined threshold amount, or if pixels within the first part are lighter than pixels within the second part by the second threshold amount. Also preferably, the first threshold amount is equal to the second threshold amount.

In the present third embodiment, the processing unit identifies as a correct orientation for the input image whichever of the 0-degree-rotation of the input image, 90-degree-rotation of the input image, 180-degree-rotation of the input image, or 270-degree-rotation of the input image that corresponds to the first, second, third, or fourth set of logic bits that is identified as the true set of logic bits.

Additionally, if the first search operation finds at least one occurrence of the predefined indicator prefix bit-sequence, then the detect bitstring unit skips the second, third and fourth search operations, and the first set of logic bits is identified as the true set of logic bits; else if the second search operation finds at least one occurrence of the predefined indicator prefix bit-sequence, then the detect bitstring unit skips the third and fourth search operations, and the second set of logic bits is identified as the true set of logic bits; else if the third search operation finds at least one occurrence of the predefined indicator prefix bit-sequence, then the detect bitstring unit skips the fourth search operation, and the third set of logic bits is identified as the true set of logic bits; else the detect bitstring unit implements the fourth search operation, and the fourth set of logic bits is identified as the true set of logic bits.

Also preferably, the detect bitstring unit implements each of the first, second, third, and fourth search operations, and determines a respective first, second, third, and fourth message-length value indicative of the number of data bits between repeated occurrences of the predefined indicator prefix bit-sequence in each of the first, second, third, and fourth search operations, and if the first message-length value matches a predefined message bit length more closely than the second, third, and fourth message-length values, then the first set of logic bits is identified as the true set of logic bits; else if the second message-length value matches the predefined message bit length more closely than the first, third, and fourth message-length values, then the second set of logic bits is identified as the true set of logic bits; else if the third message-length value matches the predefined message bit length more closely than the first, second, and fourth message-length values, then the third set of logic bits is identified as the true set of logic bits; else if the fourth message-length value matches the predefined message bit length more closely than the first, second, and third message-length values, then the fourth set of logic bits is identified as the true set of logic bits.

Also in the present embodiment, the predefined indicator prefix bit-sequence is preferably unique from the remaining bit sequence in the embedded message. For example, the embedded message may includes an input message "M" consisting of only printable characters, and the predefined indicator prefix bit-sequence includes at least one non-printable character.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

Figure 1:
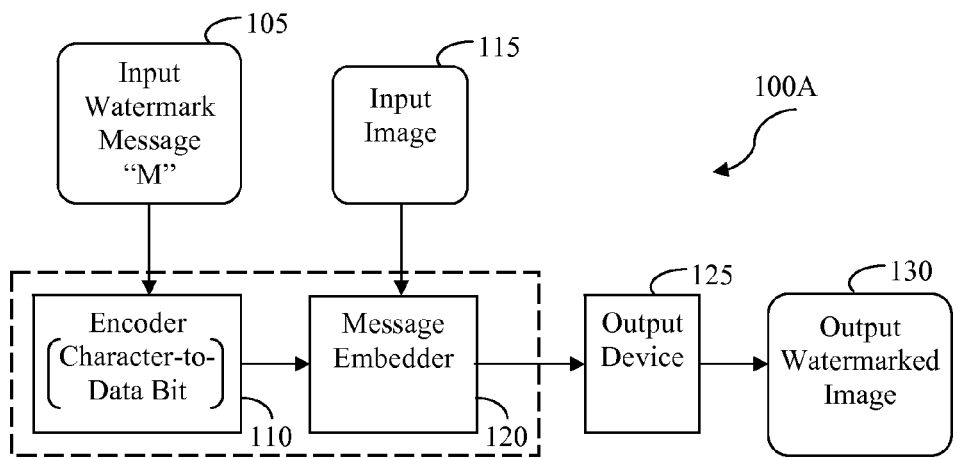
FIG. 1 shows a system for embedding an Input Watermark Message into an Input Image.

FIG. 1 depicts a system 100A for embedding an Input Watermark Message 105 into an Input Image 115. System 100A comprises an encoder 110 to receive and encode watermark message M, and a Message Embedder 120 to embed the encoded watermark message output from Encoder 110 into Input Image 115. An output device 125 renders the output from Message Embedder 120 as an Output Watermarked Image 130 that consists of Input Image 115 with embedded, encoded watermark message "M". In a preferred embodiment, output device 125 is a printer and Output Watermarked Image 130 is rendered on print media, such as paper.

Encoder 110 receives Input Watermark Message 105 (hereinafter also identified as input message "M") for watermarking onto Input Image 115, and generates a bit vector representation of input message "M" in a bit-encoded format, such as ASCII, for example. In a preferred embodiment, a predefined indicator prefix ("A") is added to (i.e. appended to the front of) input message "M" to define a composite message bit vector "AM", which can then be embedded into Input Image 115.

Indicator prefix "A" is preferably a known bit pattern used to aid a watermark extractor to identify the beginning of composite message bit vector "AM", as is explained more fully below. In a preferred embodiment, the character or characters that constitute indicator prefix "A" may be chosen so that the bit representation of indicator prefix "A" is distinct from input message "M", or is unique from any character in input message "M".

It is presently preferred that input message "M" be comprised of text characters (preferably printable text characters), and that the text characters be bit-encoded (typically eight bits per character). It is also preferred that indicator prefix "A" be made up of a unique bit-encoded sequence, which may also define characters (printable or otherwise). In this manner, the "AM" bit sequence defines the message bit vector. For example, if each character is subject to 8-bit encoding, a message bit vector consisting of 88 bits would represent a composite AM sequence consisting of 11 characters.

In an alternative embodiment, the composite message bit vector "AM" may be further encoded using error-correcting code (hereafter, "ECC"). An example of an ECC is the Reed-Solomon code, which operates on multi-bit blocks such as, for example, 8-bit encoded characters. One skilled in the art will recognize that other error correction codes, or algorithms, may be employed. It is noted that ECC encoding will generally add a set of n parity bits ("P") to the "AM" bit-sequence. In the following discussion, the present encoding sequence (or message bit vector) that includes the use of error correction code is therefore identified as extended message bit vector "AMP".

Extended message bit vector "AMP" represents an encoded message bit vector having a prefix indicator "A", an input message "M", and n ECC parity bits "P". One skilled in the art will recognize that the selection of an error correction code algorithm depends on the encoding scheme and length of composite message bit vector "AM", and that the number of parity bits n depends on the maximum number errors that can be corrected. The selection of an ECC is not critical to the present invention.

Message Embedder 120 receives an encoded message bit vector (i.e. "AM" or "AMP") from encoder 110, and embeds it into Input Image 115. In cases where Input Image 115 includes printed characters (i.e. a document containing Western writing characters (such as letters, numbers, punctuation marks, etc.) or containing Eastern writing characters (such as Japanese or Chinese characters), each printed character is a potential "embedding site" into which a representation of a data bit from the encoded message bit vector may be embedded.

Each printed character that is suitable for use as an embedding site preferably satisfies one or more constraints to qualify as an embedding site. Furthermore, the embedding sites within a given Input Image 115 may be ordered in a particular sequence. In embodiments in which the number of embedding sites is greater than the bit-length of the encoded message bit vector ("AM" or "AMP"), multiple instances of the encoded message bit vector may be repeatedly embedded into the image. Preferably, the multiple instances of the encoded message bit vector are arranged as a bit stream. Each data bit in the bit stream may be embedded into a separate, corresponding embedding site to create Output Watermarked Image 130. Embedding multiple instances of the encoded message bit vector improves the robustness of the image watermarking because it increases the likelihood of correctly extracting a complete watermark message even if the Output Watermarked Image 130 (and thereby also the embedded watermark message) is modified such as by cropping, scanner/printer error, or some other cause.

Figure 2:
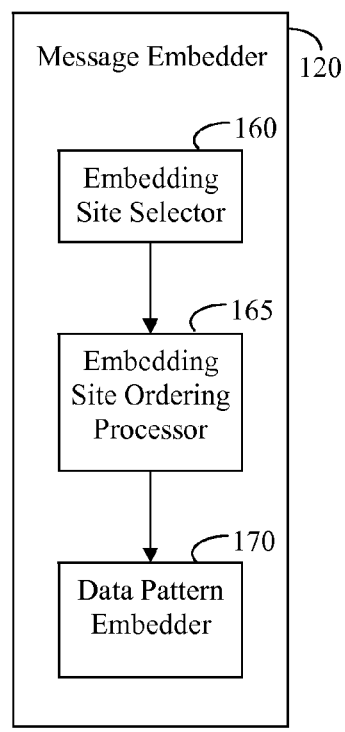
FIG. 2 provides an internal view of the Message Embedder of FIG. 1.

An internal view of Message Embedder 120 is provided in FIG. 2. As shown, Message Embedder 120 may include an Embedding Site Selector 160, an Embedding Site Ordering Processor 165, and a Data Pattern Embedder 170. Embedding Site Selector 160 receives and analyzes Input Image 115 to identify characters suitable for use as embedding sites. These potential embedding sites may be grouped into sets. Input Image 115 may further be segmented into pixel groups of foreground pixels that represent characters such as English text characters, Japanese character strokes, or line art.

An individual character may be identified as a bounded region of adjacent foreground pixels within a segmented pixel group. Such a bounded region of adjacent foreground pixels is termed a "connected component" that may identified and labeled by performing a Connected Component Analysis (CCA). One skilled in the art will recognize that various methods of segmentation and CCA may be used and that no particular segmentation or CCA method is critical to the present invention. Each identified connected component within an image constitutes a character, and is a potential embedding site. Each connected component is preferably fitted with a "bounding box," which is preferably a rectangle of minimum area required for enclosing the pixels within the connected component.

Embedding Site Ordering Processor 165 receives the identified embedding sites and orders them based on the coordinates of their bounding boxes.

Data Pattern Embedder 170 receives extended message bit vector "AMP" (or composite message bit vector "AM") and embeds each data bit in "AMP" into a corresponding embedding site within Input Image 115 according to the ordering sequence defined by Embedding Site Ordering Processor 165. For the sake of simplicity, it is assumed hereafter that the input bit stream is encoded following the extended message bit vector "AMP" format.

Preferably, data bit information is embedded in each embedding site by dividing the embedding site into two halves, or portions, and assigning a different light intensity value (i.e. darkness level) to pixels in each of the two halves. For example, if the rectangle that defines the boundary of n embedding site is divided into an upper half and a lower half, the upper or lower half of the rectangle may be darker depending on whether the encoded bit data is a logic "1" or logic "0".

In the presently preferred embodiment, the rectangular shape of each embedding site is divided into an upper part (i.e. upper half) and the lower part (i.e. lower half). A bit value of "0" is embedded by assigning an intensity value of zero (i.e., black in a 256 value color scale) to pixels in the upper part of the embedding site and assigning an intensity value of 80 (i.e. gray in the same 256 value color scale) to pixels in the lower part of the embedding site. Similarly, a bit value of "1" is embedded by assigning an intensity value of zero (i.e., black) to pixels in the lower part of the embedding site and assigning an intensity value of 80 (i.e., gray) to pixels in the upper part of the embedding site. Those skilled in the art will recognize that other relative brightness intensities, visual encoding schemes, and portion divisions may be selected for representing data bit values. For example, the intensity differences may be selected such that the embedded message is invisible or nearly invisible to an observer while at the same time being more reliable for detection through machine image processing.

Figure 3:
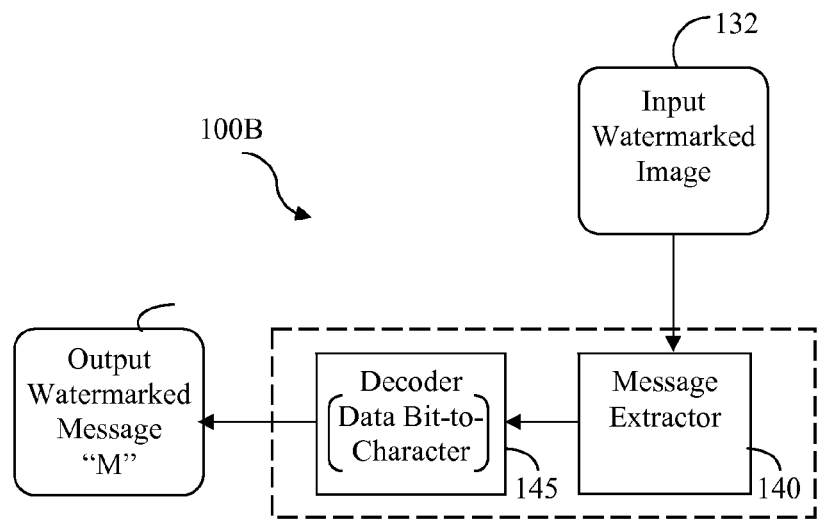
FIG. 3 depicts a watermark extractor system for extracting an embedded message bit vector from an Input Watermarked Image.

FIG. 3 depicts a watermark extractor system 100B for extracting an embedded message bit vector (such as "M", "AM", or "AMP") from an Input Watermarked Image 132. It is to be understood that Input Watermarked Image 132 may be Output Watermarked Image 130 of FIG. 1, or a digital reproduction of Output Watermarked Image 130.

Watermark extractor system 100B includes a Message Extractor 140 and a Decoder 145. Input Watermarked Image 132 is preferably a digitized representation of a printed document (i.e. Output Watermarked Image 130), such as one generated by a scanner. It is to be understood that Input Watermarked Image 132 could have been generated from a printed representation of Output Watermarked Image 130 of FIG. 1. Message Extractor 140 receives Input Watermarked Image 132 and extracts one or more message bit vectors (or portions thereof) that have been embedded within Input Watermarked Image 132.

Figure 4:
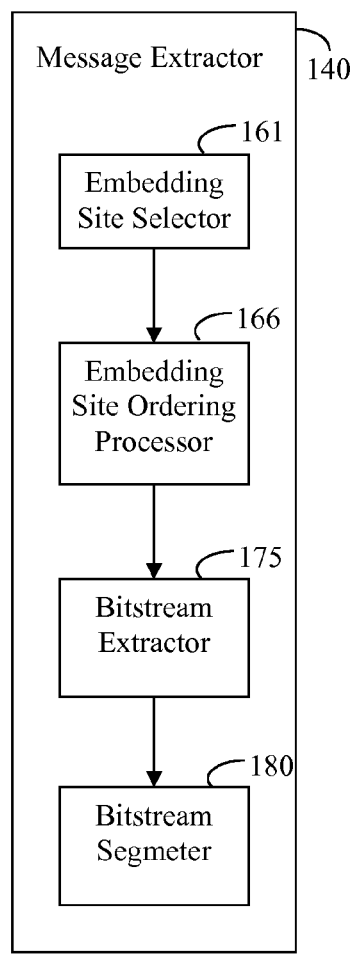
FIG. 4 provides an internal view Message Extractor of FIG. 3.

An internal view of Message Extractor 140 is provided in FIG. 4. Like Message Embedder 120 of FIG. 2, Message Extractor 140 may include its own Embedding Site Selector 161 and Embedding Site Ordering Processor 166. Message Extractor 140, however, further preferably includes a Bitstream Extractor 175 and a Bitstream Segmenter 180. Embedding Site Selector 161 identifies potential embedding site in a manner similar to Embedding Site Selector 160, describe above, and Embedding Site Ordering Processor 166 sequences the identified potential embedding sites in a manner similar to Embedding Site Ordering Processor 165, also described above. In this manner the original embedding sites, in their original ordered sequence, as encoded within Output Watermarked Image 130 of FIG. 1 (from which Input Watermarked Image 132 is generated) are recovered.

Bitstream extractor 175 extracts a bit stream from Input Watermarked Image 132 by examining each embedding site to determine which of the upper or lower half of the rectangle that defines the embedding site is darker. For example, a data bit value may be determined by first computing the average intensity values of the pixels within each portion (i.e. upper or lower half) of an embedding site, and then computing the relative difference between those values to identify an embed pattern, if any. The average intensity value may be the mean, median, or mode. Also, the average intensity value may be a robust mean of a sample of pixels that is created by, for example, removing very light or dark pixels or removing boundary pixels. In the presently preferred embodiment, the portions are the upper and lower parts (i.e. halves) of a rectangular embedding site. The intensity difference between the upper and lower parts is calculated, and if the intensity difference is greater than a threshold, an embed pattern is identified and a logic data bit is extracted from that embedding site.

For example, the data bit value would be assigned a logic level of "0" if the upper part of the embedding site were darker then the lower part by a first threshold amount. Similarly, the data bit value would be assigned a logic level of "1" if the upper part of the embedding site were lighter than the lower part by a second threshold amount (the first and second threshold amounts may be the same or different). Comparing the intensity difference between portions of an embedding site (i.e. a connected component) makes the present approach robust even if the overall intensity of the Input Watermarked Image 132 has been degraded, or otherwise modified, through the half-tone effects produced by a printer, for example.

Bitstream Segmenter 180 segments the identified data bit stream by extracting instances of the message bit vector (preferably "AMP", but alternatively "AM"). By identifying indicator prefix "A" in the data bit stream, Bitstream Segmenter 180 identifies the beginning of each repeated message bit vector "AMP" within the data bit stream.

Returning to FIG. 3, Decoder 145 receives one or more data bit vectors, decodes the data bits into characters to create a character string, and outputs the decoded character string as Recovered Watermark Message 106, which should match Input Watermark Message 105 of FIG. 1.

In case where the data bit vector is encoded using an ECC code, decoder 145 would include an ECC decoder, and the parity portion of the data bit vector would be used by the ECC decoder to correct errors that may be in the data portion (i.e. input message "M") of the data bit vector. One example of such errors is swapped bits that may be a result of the process (for example, printing and/or scanning) that generated the Input Watermarked Image 132. A corrected bit vector may be a bit-encoded input message and its indicator prefix ("AM"). The Output Watermark Message may be generated by removing the indicator prefix "A" and decoding the characters in the input message "M" portion of the bit vector.

Figure 5:
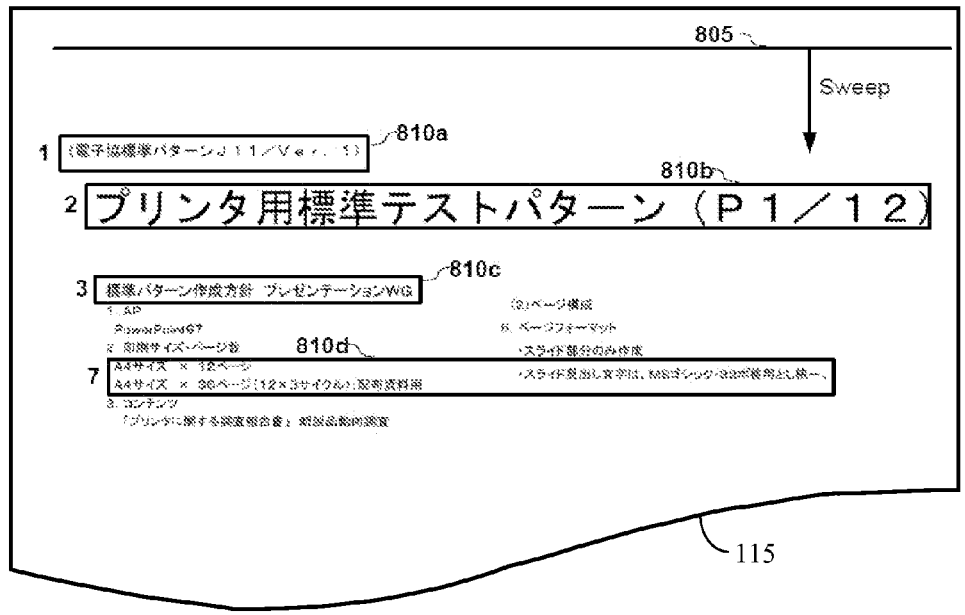
FIG. 5 shows an example of the ordering of text lines in preparation for embedding an input watermark message within an input image.

FIG. 5 is an example of the ordering of text lines in preparation for embedding an input watermark message "M" within an input image 115 according to a preferred embodiment. A vertical sweep of horizontal line 805 is performed from the top of an image (for example, input image 115) to the bottom of the image. For illustration purposes, boxes have been drawn around delimited character lines (810a to 810d). The ordering of the lines follows the direction of the sweep of horizontal line 805. The number at the left of each box (i.e. 1, 2, 3, and 7) identifies its character line order. In this example, box 810a surrounds the first character line in order, and box 810c surrounds the third line in order. Box 810d, which surrounding the seventh character line in order, illustrates that a region containing three lines of text characters has been delimited as a single text line in the sweep because the horizontal sweep line did not meet a constraint of covering no pixels in connected components until after it had swept below the second line of text, that starts with text characters "A4 . . . ".

A decision about the ordering of text lines may be made based on the number of text lines delimited as a result of the vertical sweep. For example, after completing a vertical sweep of a horizontal line from the top of the image to the bottom of the image, the image (i.e. input image 15) may be rotated by an angle of 90 degrees, and the vertical sweep of horizontal line 805 from the top of the image to the bottom of the image may be repeated using the rotated image. The direction used for ordering of text lines may be chosen based on the sweep (before or after rotation) that delimited (i.e. identified) the greater number of character lines. That is, the number of character lines generated from sweeping the original image and the rotated image determines if the image is right-side up or on its side.

Figure 6:
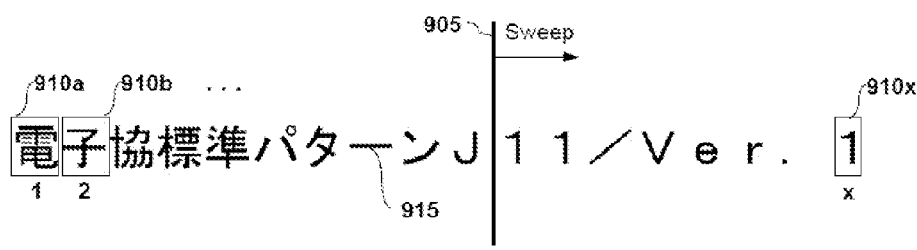
FIG. 6 depicts the sweeping of a vertical line for purposes of ordering embedding sites.

With reference to FIG. 6, the embedding sites on each character line are ordered by sweeping a vertical line 905 horizontally across each character line from the beginning embedding-site-bounding-box 910a (box that defines the boundary of an embedding site) on the character line to the last embedding-site-bounding-box 910x on the character line. In the present example of FIG. 6, which orders embedding-site-bounding-boxes within a character line of an image, a horizontal sweep of a vertical line 905 is performed from the beginning of the character line at the left side of the character line to the end of the character line at its right side. For illustration purposes, boxes approximating embedding-site-bounding-boxes (910a to 910x) are drawn around embedding sites. In this example, embedding-site-bounding-box 910a identifies the first embedding site on the character line, embedding-site-bounding-box 910b identifies the second embedding site in order, and embedding-site-bounding-box 910x identifies the last embedding site in order. Candidate embedding site 915 is not ordered in this example because it was excluded as an embedding site due to a preferred size constraint.

Figure 7:
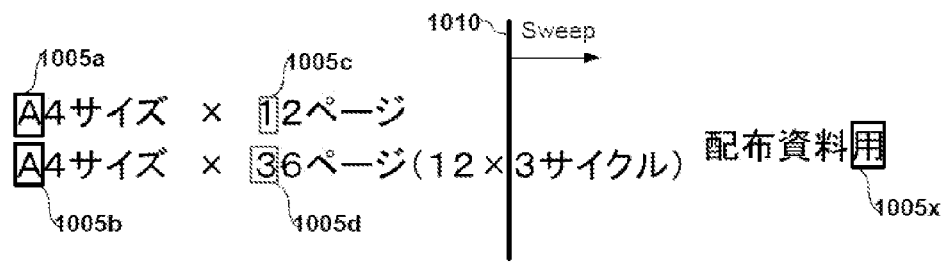
FIG. 7 illustrates the ordering embedding-site-bounding-boxes within a delimited character line that spans multiple lines of characters.

Illustrated in FIG. 7 is an example of ordering embedding-site-bounding-boxes within a delimited character line that spans multiple lines of characters (i.e. text characters in the present example). A left-to-right horizontal sweep of a vertical line 1010 is performed from the beginning of the character line to the end of the character line. For illustration purposes, boxes approximating embedding-site-bounding-boxes (1005a-1005x) have been drawn around embedding sites. If vertical line 1010 sweeps across two embedding sites whose embedding-site-bounding-boxes are in vertical alignment (for example embedding-site-bounding-boxes 1005a and 1005b), only one of the embedding-site-bounding-boxes (e.g. 1005a) is ordered. However, if two embedding-site-bounding-boxes are not vertically aligned, they both are ordered according which box sweeping vertical line 1010 reached first. In the present illustration, embedding-site-bounding-box 1005*d* is ordered before embedding site 1005*c*. Embedding site 1005*x* is ordered last in the character line.

Figure 8:
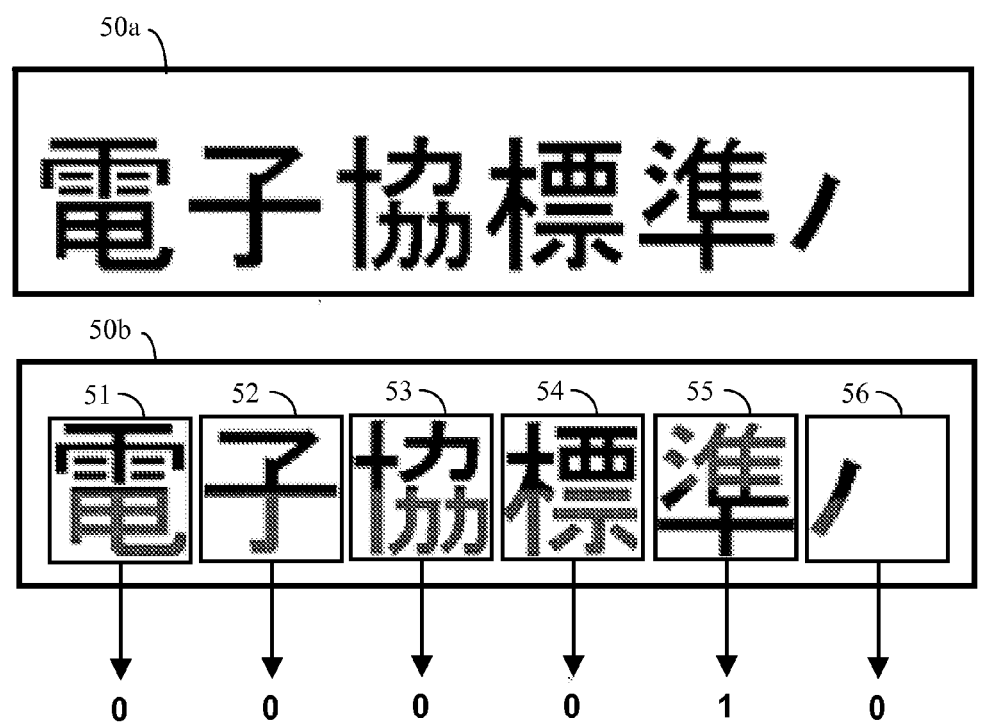
FIG. 8 shows an example of embedding logic bit data into characters according to encoding method representing logic 0's and logic 1's by altering the darkness level of the upper or lower part of characters.

FIG. 8 is an example of embedding bit data into characters (i.e. whose rectangular outlines illustratively constitute embedding sites) according to the presently preferred encoding method of representing logic 0's and logic 1's by altering the darkness level of the upper or lower part of characters (or text) within rectangular embedding sites (i.e. within embedding-site-bounding-boxes). Box 50*a* outlines a series of characters in a partial text line prior to embedding data, and box 50*b* outlines the same series of characters after embedding bit data.

Embedding sites 51-56 are illustrated as boxes around individual Japanese text characters. As an illustration, bit data sequence "000010" is embedded into embedding sites 51-56, in order. As shown, embedding sites 51-54 and 56 have their respective lower portion lighter than their respective upper portion, and thus each represent a logic low, i.e. a logic "0". By contrast, embedding site 55 has its upper portion lighter than its lower portion, and thus it represents a logic high, i.e. a logic "1".

Optionally, the embed pattern representing a data bit value may be enhanced by applying morphological dilation to the pixels in the lighter portion of an embedding site, thus making the printed text thicker in that region. This enhancement may be applied to all embedded data values within an image.

The process of recovering the imbedded message, as is described above, consists of scanning a printed version of the watermarked image, and re-applying a similar process of identifying text lines and identifying potential embedding sites within the characters lines (or text lines). The identified, potential embedding sites are then ordered in a manner similar to how the originally embedded message was ordered, and each potential embedding site is then examined, in order, to determine whether the pixels in its upper part is darker than the pixels in its lower part (or vise versa). From this determination, it is then possible to extract the embedded logic "0" or logic "1" bit data, and thus recovered the embedded data sequence (i.e. bit string). As is also explained above, this sequence may be facilitated by using a prefix marker "A" to identify the beginning of each message "M", and by the use of ECC encoding "P" to correct any misidentified data bits.

As is also explained above, the present watermarking approach is suitable for both Western writing and Easter writing. Since some Easter writing (such as Japanese and Chinese) may be oriented either horizontally or vertically, the process of recovering an embedded message should also includes a step of determining if the embedding sites are (i.e. if the written characters are) oriented horizontally or vertically, prior to attempting to recover an embedded message. As is also explained above, a preferred method of making this determination is to scan an input image in one direction (typically horizontally), and then re-scan the same image in a second direction 90° to the first. In essence, the input image is scanned horizontally, and then reorient in a second orientation 90° to the first (i.e. vertically, if the first orientation was horizontally) in preparation for a second horizontal scan. Thus, the presently preferred approach examines character lines horizontally in both images and looks for potential embedding sites in both orientations. If more potential embedding sites are found in the first orientation, then the image is assumed to have horizontally oriented writing, and the process of recovering the embedded data proceeds with this assumption. If more potential sites are found in the rotated image of the second orientation, then it is assumed that the writing is vertically oriented, and the process of recovering the embedded data proceeds with this assumption.

Although this process accomplishes the goal of recovering an imbedded image from both Western and Eastern writing, two potential sources of error in the message recovering process may still arise. Both of this sources of error are related to the scanning of the printed watermarked image.

The first source of error is due to the paper (i.e. the print media on which the watermarked image is printed) being misaligned on the scanner during the initial scanning process. If the printed watermarked image is placed askew on a scanner, then the resultant scanned image will not be aligned horizontally or vertically, which would complicate the above-described method of extracting the embedded message. A solution to this first source of error is to first correct for any skew error prior to applying the above-described process of recovering the embedded message. A presently preferred process and mechanism for correcting this source of error is described below.

The second source of error is that a printed watermarked image may be placed with a 180 degree rotation on the scanner such that the top of the image is where the scanner expects the bottom of a scan document to be, and the bottom of the image is where the scanner expects the top of the scan document to be. For example, if the original text is oriented horizontally from left-to-write, the printed paper holding the watermarked image may be placed with 180° rotation on the scanner such that not only is the text orientated upside down from the scanner's point of view, but the text is now also oriented from right-to-left. Similarly, if the original text was oriented vertically from top-to-bottom, and the printed watermarked image is placed on the scanner with a 180° rotation, the text will again be oriented upside down and further be oriented from bottom-to-top. Thus a solution to this problem requires determining when a scanned image has text oriented upside-down relative to the scanner's point of view, and then correcting this error prior to applying the above-described method of recovering the embedded message.

Before being able to discern if a scanned image has a 180 degree rotation (i.e. having text characters oriented up-side down relative to a scanner), it is helpful to first assure that the image document to be scanned is aligned properly on the scanner, i.e. assure that it is not askew. Thus, the problem of how to correct for skew angle is addressed first.

Figure 9:
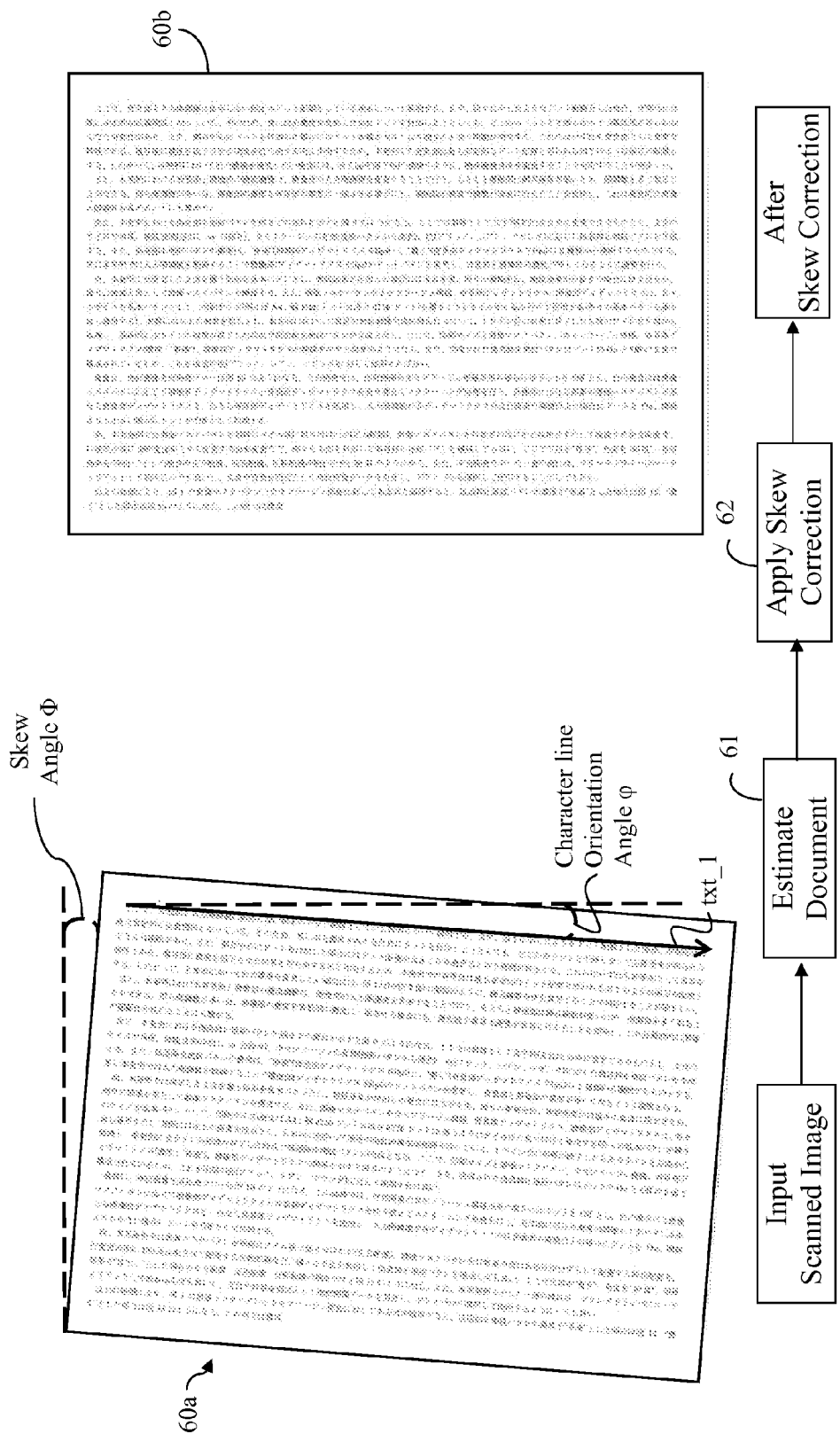
FIG. 9 illustrates the estimating and correcting of document skew angle Φ.

With reference to FIG. 9, 60*a* is a rendition of an input scanned image having a skew angle problem. That is, the scanned image is not aligned vertical or horizontally. The first step in addressing this problem is to apply a process 61 to estimate the document orientation skew angle $\Phi$ of scanned image 60*a*. A dark arrow identifies a text line txt_1 (or character line), and the orientation angle $\phi$ of text line txt_1 relative to a vertical line (or horizontal line, whichever provides a smaller orientation angle $\phi$) may provide an estimate of orientation angle $\Phi$, as is explained below. Once an estimate of the skew angle $\Phi$ (i.e. the document orientation angle) is obtained, skew correction may be applied (block 62) and the scanned image rotated by $-\Phi$ degrees to compensate for the skew angle $\Phi$. The resultant, corrected image is shown as 60*b*.

Figure 10:
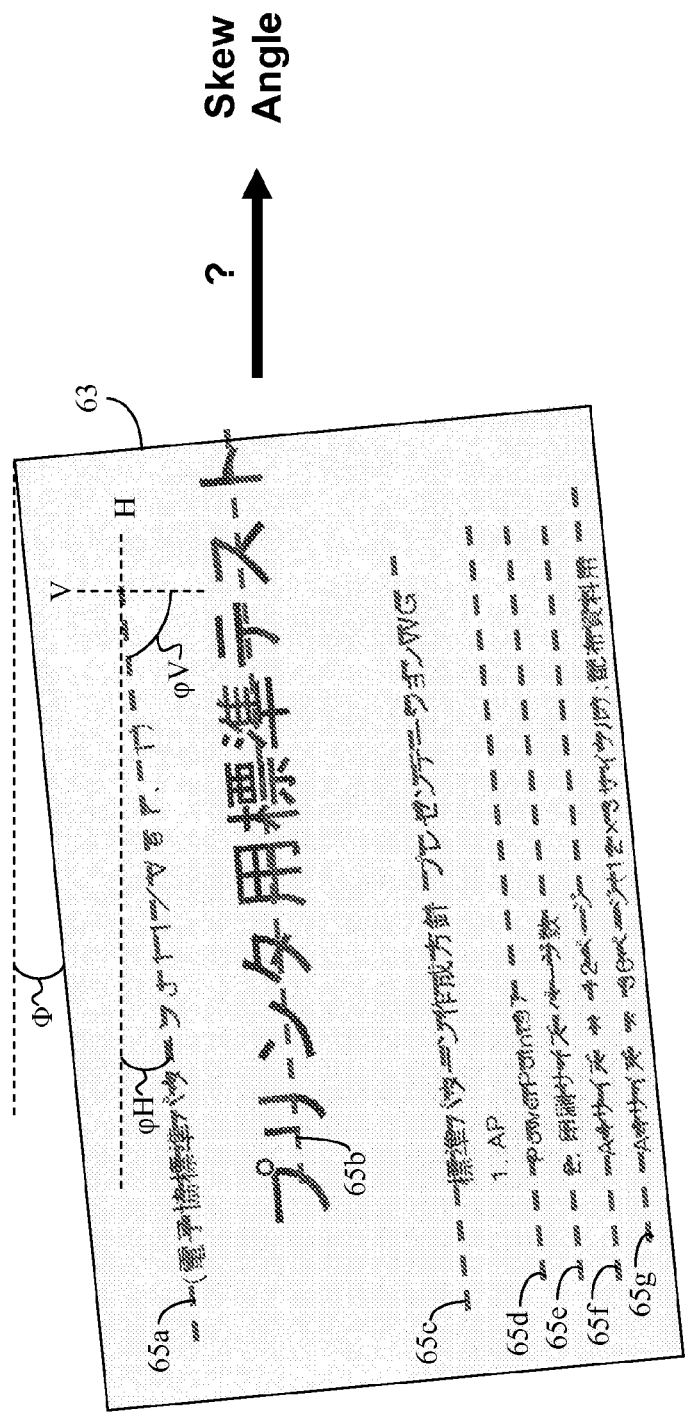
FIG. 10 provides another example of an input image with a document skew angle.

FIG. 10 illustrates is closer look at another sample input scan image 63 having an unknown document skew angle $\Phi$. The presently preferred method for estimating document orientation (i.e. document skew angle $\Phi$) makes use of character alignment (alternatively, characters aligned to form text lines or character lines) within the input scanned image to determine document orientation. Dotted lines 65*a*-65*g* indicate the general direction of corresponding text lines (or character lines), and thus are indicative of each text line's orientation.

As an example, the orientation angles φH and φV of text line 65a relative to a horizontal reference line and a vertical reference line, respectively, are shown. It is to be understood that each text line would have its own orientation angle, and that the orientation angles of all text lines are not necessarily identical. Nonetheless, a first step in the present approach is to identify text lines, and their respective general orientation (i.e. respective orientation angle φ) relative to a reference vertical line V or a reference horizontal line H, which ever renders a smaller angle value. In the present example, angle φH relative to reference horizontal line H is taken as the orientation angle φ of text line 65a since it is smaller than the angle φV relative to reference horizontal line V.

This approach of identifying text lines and their respective general orientations is preferred since it makes use of part of the above-described method for embedding and extracting water messages. As is explained above, a first step in the embedding or extracting process is to identify potential embedding sites at distinct character locations, which when aligned, constitute text line. Thus, a skew correction process may be seamlessly incorporated into the present watermarking decoding process.

Figure 11:
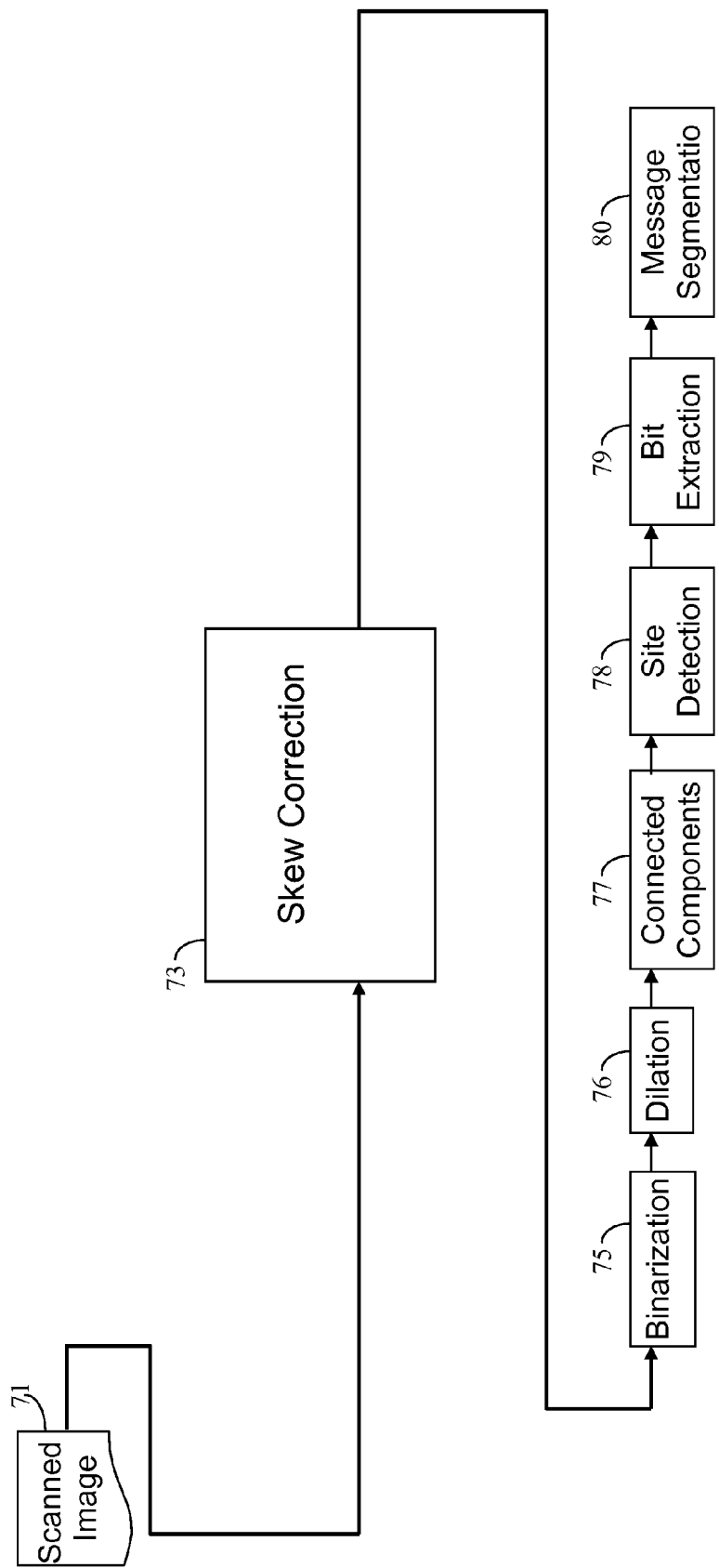
FIG. 11 shows a preferred work flow for document skew correction.

With reference to FIG. 11, a currently preferred work flow for skew correction applies a scanned image 71 to a Skew Correction block 73, which compensates for any skew error before passing the corrected image to be processed for watermark extraction. A first step in the extracting of the watermark message is Binarization block 75. As it is known in the art, an image binarization typically converts an image (typically of up to 256 gray levels) to a black and white image as preprocessing for identifying text characters. Various methods of binarization are known in the art, but a well-known method is to use a threshold value and to classify all pixels with values above this threshold as white, and all other pixels as black. The resultant binarized image is then applied to an optional Dilation step 76 that thickens certain character pixels for easier reading by later steps. Connected Components block 77, as is explained above, then identifies bounded regions of adjacent foreground pixels to identify individual characters. Site Detection block 78 then identifies the potential embedding sites, and Bit Extraction block 79 extracts the bit data as a bit stream that is passed to Message Segmentation block 80. Message Segmentation block 80 then segments the bit stream into discrete, complete messages "M", as determined by the prefix identifier "A", and corrected by the error correction code "P".

Figure 12:
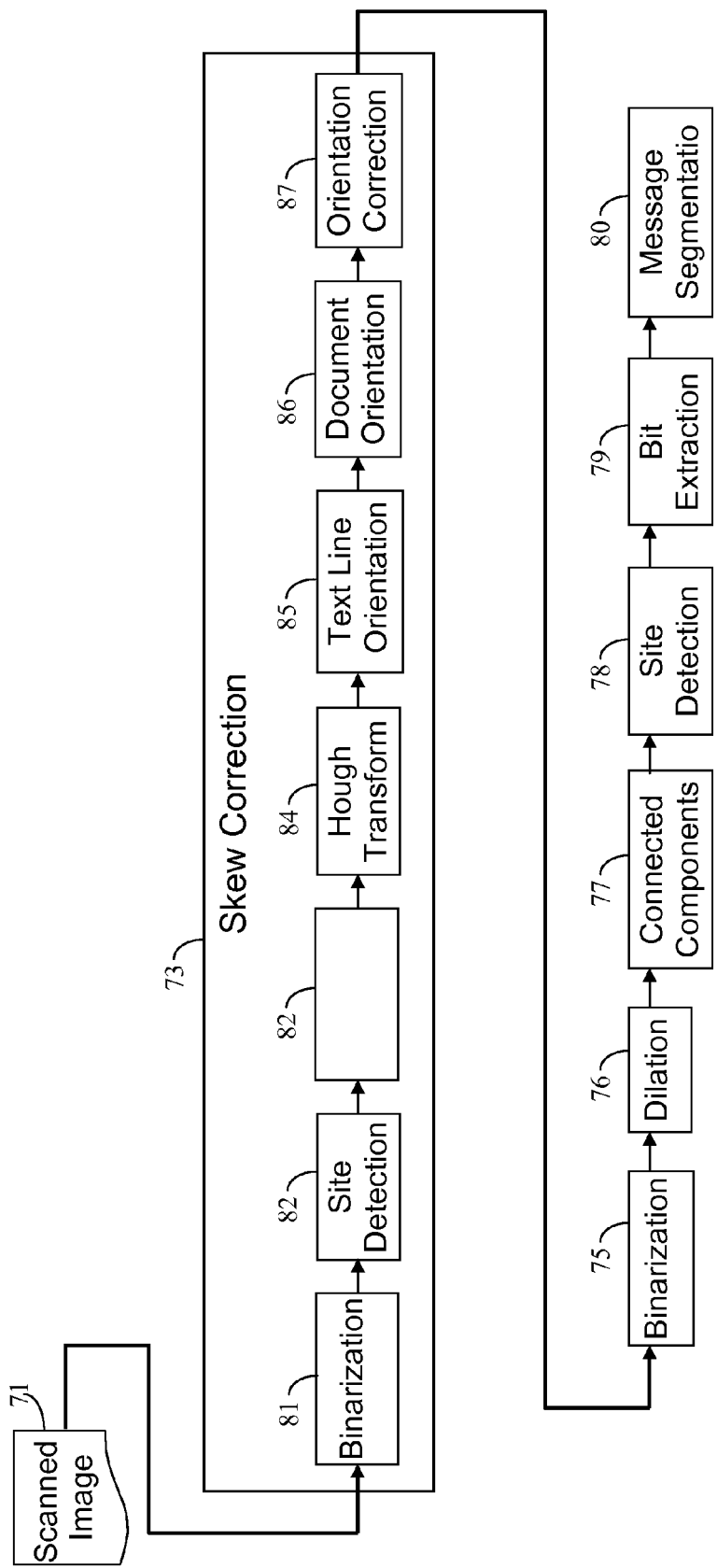
FIG. 12 provides a more detail view Skew Correction block 73 of FIG. 11.

With reference to FIG. 12, an internal view of Skew Correction block 73 shows a Binarization block 81 and a Site Detection block 82 similar to the above-described Binarization 75 and Site Detection 78 blocks used in the extracting of embedded messages, but Skew Correction block 73 may omit an application of site selection criteria. All elements similar to those of FIG. 11 have similar reference characters and are described above. Once the sites are detected, Centroid Estimation block 83 determines the bounding box of each site.

Figure 13:
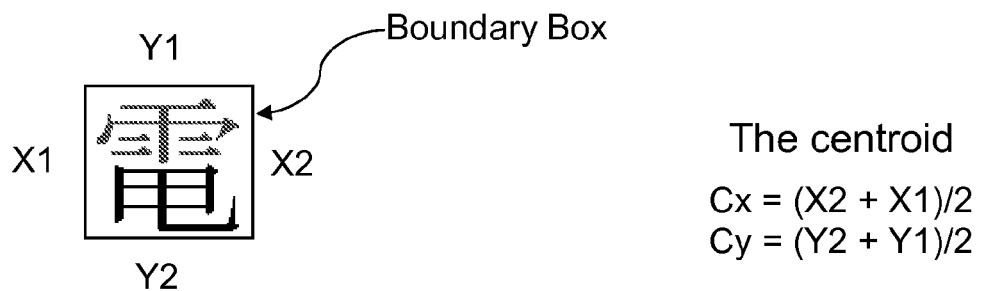
FIG. 13 illustrates a bounding box around a character, and the calculation of its centroid.

An example of such as bounding box is shown in FIG. 13, where X1 and X2 identified the left and right boundaries, and Y1 and Y2 identify the upper and lower boundaries. The centroid of each site is computed from the bounding box by computing the midpoint distance between X1 and X2, and the midpoint distance between Y1 and Y2. Specifically, the centroid of each site is identified as $$Cx=(X1+X1)/2$$

and $$Cy=(Y1+Y2)/2$$

Figure 14:
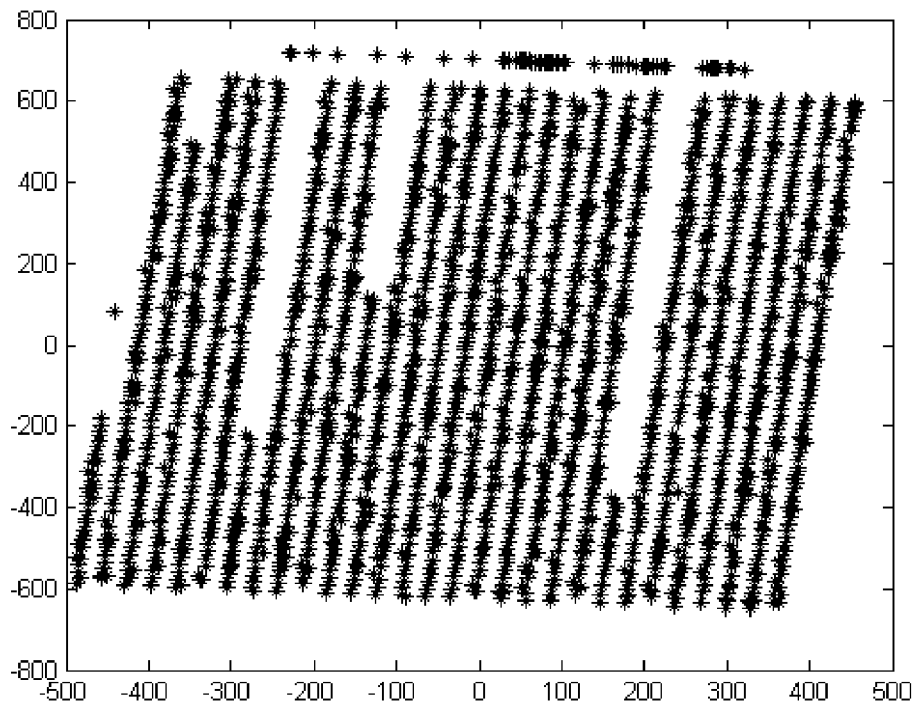
FIG. 14 shows a sample mapping of centroids.

With reference to FIG. 14, a sample mapping of the centroids of the text site (i.e. character sites) is used to estimate the skew of the scanned image. In the present example, each asterisk (i.e. star) represents a centroid, and thus also represents a text site.

The presently preferred method of estimating the skew angle makes use of the Hugh transform. Thus, the estimated centroid locations are then passed to a Hough transform 84 of FIG. 12.

As it is known in the art, the Hough transform is a feature extraction technique typically used to find instances of objects within a certain class of shapes. The Hough transform is typically used to identify positions of arbitrary shapes, such as circles, ellipses, or lines. Since the Hough transform is generally known in the art, a detail discussion of the Hough transform is not provided here. However, a short overview of the Hough transform may be summarized as the transposing of objects-of-interest in a first image space to a second space that uses a different parameter set distinct from that of the first image space to define the same objects-of-interest. The idea is that the use of the different parameter set simplifies the identification of the objects-of-interest in the second space.

For example, a straight line can be described in a Cartesian plane as y=mx+b, and is defined by a series graphically plotted points, each defined by a coordinate pair (x, y). Although one could identify the straight line by identifying the series of plotted dots that define it in the first image space, an image may have imperfections (such as extra or missing points) that complicate this process. It would better to reduce dependence on the individual printed points, and instead define the line in terms of its parameters, i.e. its slope parameter "m" and y-intercept parameter "b". Using this approach, the same line in the first image space can then defined in terms of parameter pair (m,b) in a second "parameter" space. One flaw in this second "parameter" space is that vertical lines have an infinite slope "m", and thus give rise to unbounded values in the parameter pair (m,b). To avoid this problem, it is customary to use polar coordinates r and θ in the second "parameter" space (hereinafter Hough space), where r is a radial distance vector from the line to an origin, and θ is the angle of the vector from the origin. Using this parameter notation, the same line may be defined as:

$$y=[(-(\cos\theta \div \sin\theta))x]+(r \div \sin\theta)$$

which may be rewritten as:

$$r(\theta)=(x_0 \cos\theta)+(y_0 \sin\theta)$$

In the above-described problem of identifying straight lines, it is noted that an infinite number of lines may pass through a single point in the first image space, but each line would conform to construct: r(θ)=(x₀ cos θ)+(y₀ sin θ), which results in a sinusoidal curve in the Hough space. If the sinusoidal curves in the Hough space corresponding to two points in the first image space are superimposed, the (r, θ) location in the Hough space where the sinusoidal curves cross would correspond to lines in the first image space that pass through both points. Therefore, a set of points in the first image space that form a straight line will produce sinusoids in the Hough space that cross at the (r, θ) parameters that define that straight line. Consequently, the problem of detecting collinear points in the first image space becomes a problem of finding concurrent curves in the Hough space.

Returning now to the present problem of identifying the skew angle of scanned text with an embedded watermark message, the coordinates of the centroids are used to determine parameters, i.e. components, r and θ. In order to achieve this, multiple sweeps of radial vector r are made across the scanned image at fixed, discrete angle intervals to determine when r intercepts a centroid. The length of radial vector r is changed after each sweep. Since text characters may be written in one of two orientations (i.e. vertically or horizontally), θ is swept between −90° and +90°. With θ defined as −90°≦θ≦90°, component r is determined as:

$$r=(Cx)\cos\theta+(Cy)\sin\theta$$

Figure 15:
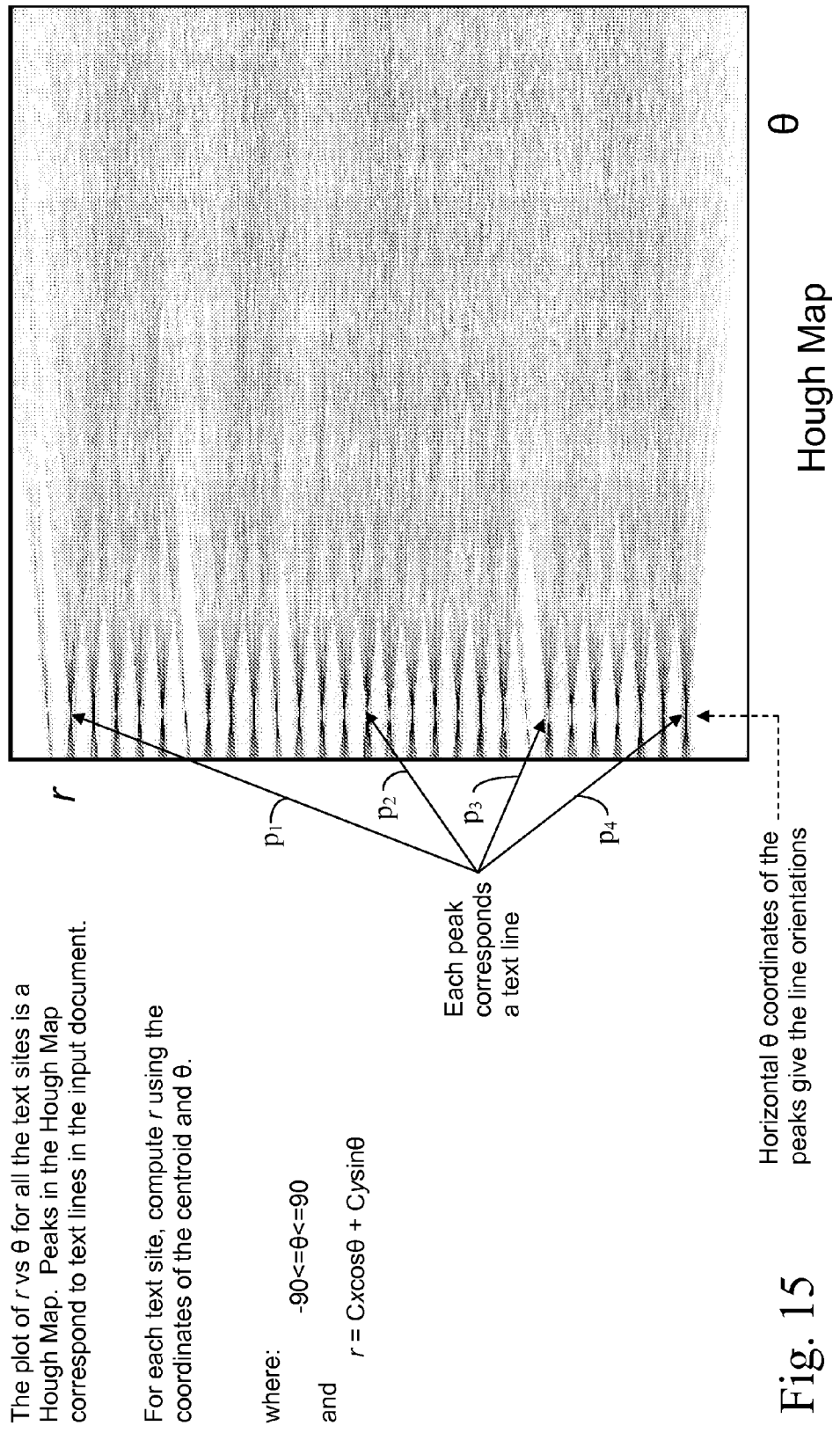
FIG. 15 shows a plotting of r versus θ on a Hough Map.

With reference to FIG. 15, the component r versus θ is plotted in a Hough Map (i.e. in Hough space) for all text sites (i.e. centroids). The result is groups of intersecting lines, and the intersection point of each group of lines is herein called a peak (fore example, $p_1$ to $p_4$) of the Hough Map. Each peak corresponds to a text line of the input scanned document image, and the θ coordinate (along the horizontal axis) of each peak corresponds to the text line's orientation angle.

Once parameters (r, θ) are obtained in Hough transform block 84 for each text line, Text Line Orientation block 85 (see FIG. 12) identifies the skew angle for each text line from its slope information (i.e., from format y=mx+b).

Document Orientation block 86 then estimates a skew angle for the whole document from the text line orientation information. In an alternate embodiment, overall skew angle for a document may be determined as the average or median of the orientation angles of all text lines.

Lastly, Orientation Correction block 87 rotates the scanned image to correct for skew angle error from a horizontal reference line as determined from the document skew information obtained in Document Orientation block 86.

As is explained above, Eastern documents (for example Japanese documents) may be written in either of two directions, i.e. orientations. It is therefore preferred that the original image document be checked for 0 to 90 degree and for −90 to 0 degree Hough maps, and their peaks in both directions be identified. The orientation that renders the greater number of peaks (corresponding to the greater number of text lines) may be assumed to be the correct orientation for the scanned image document.

The finer the increments in θ, the higher the resolution of the text angle that may be identified. In the above described sweeps of θ from 0° to 90° and from −90° to 0°, it is preferred that the increments in θ be selected in the range of 0.01 to 0.5 degrees. Since component r may be interpreted as the vector distance from an origin to each text line, the incremental value in the sweep of r depends on the minimum distance between text lines that is to be resolved. In the presently preferred embodiment, increments in component r are selected in the range of 1-20 pixels, depend ending on the font size; the larger the font size, the larger the increments in r that may be selected.

After having corrected for skew angle error, it is still necessary to determine the proper orientation of a scanned document since a document may be scanned upside down (i.e. rotated 180°), or on its side (i.e. rotated 90°).

Figure 16:
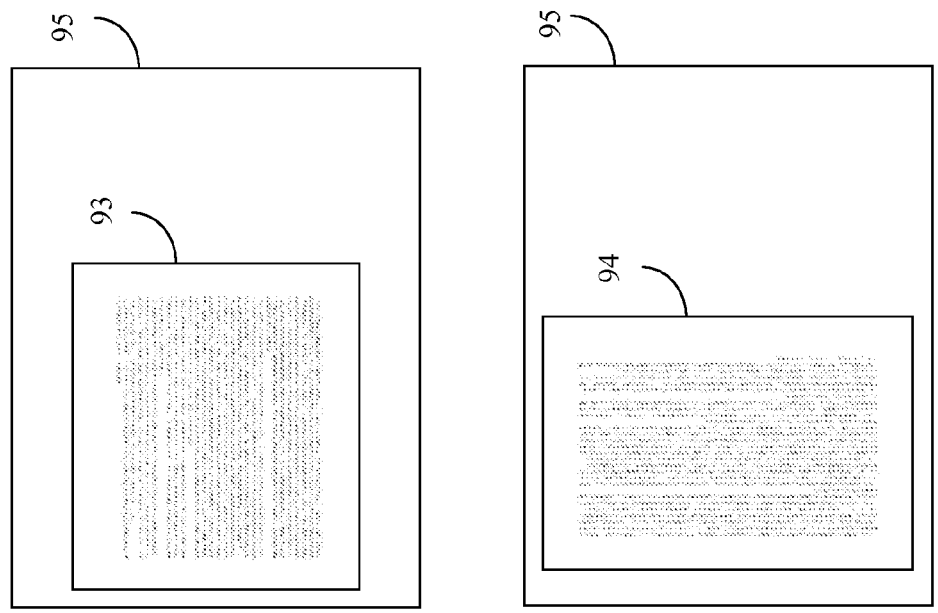
FIG. 16 shows four orientation examples of a document corresponding to orientations of 0°, 90°, 180° and 20°.
Figure 16:
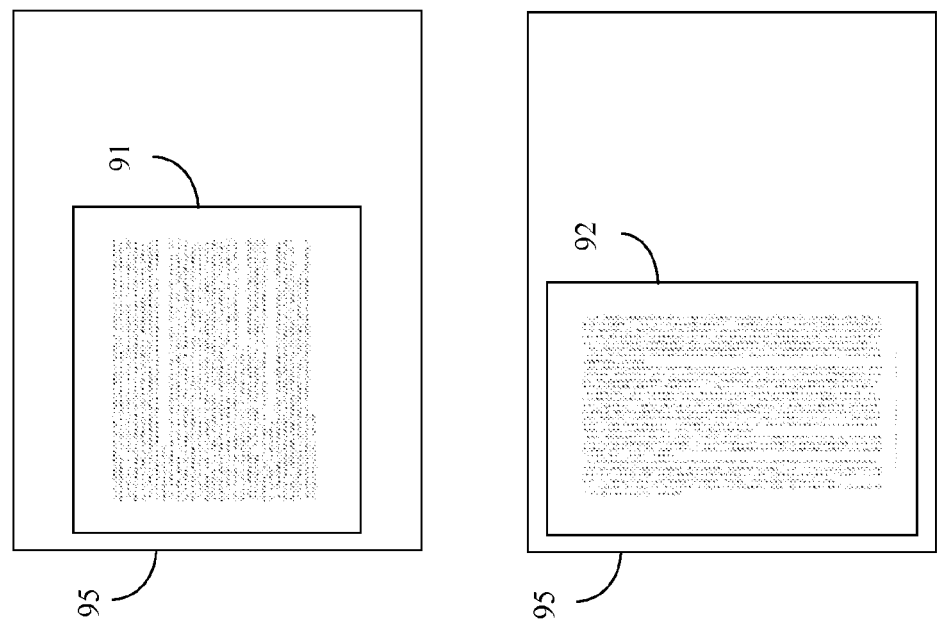

FIG. 16 shows four orientation examples 91-94 of a document (corresponding to clockwise rotations of 0°, 90°, 180° and 270°) on a scanner platen 95. The below described procedure permits the present decoder to recover an imbedded messaged from a document scanned in any of these four orientations. Correcting for proper document orientation may be seamlessly incorporated into the present embedded water mark extracting decoder/process.

Figure 17:
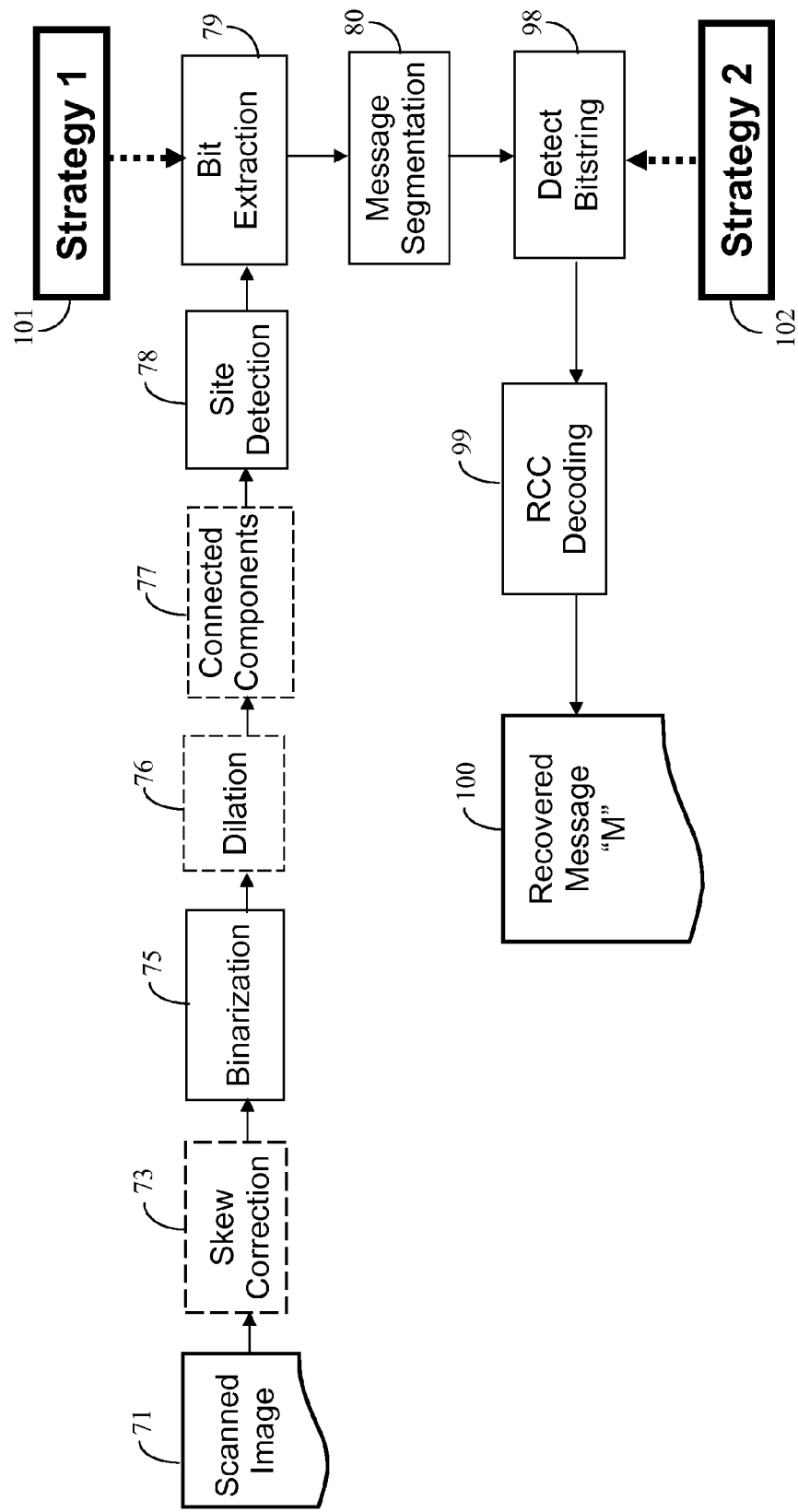
FIG. 17 shows the addition of two strategies into the work flow for recovering an embedded message from an input image, where the two strategies correct for the orientations depicted in FIG. 16.

With reference to FIG. 17, (where elements similar to those of FIG. 11 have similar reference characters and are explained above) scanned image 71 may be applied to optional Skew Correction block 73 (shown in dotted lines) before being applied to Binarization block 75. If no skew correction is needed, then scanned image 71 may be applied directly to Binarization block 75. As before, the output of Binarization block 75 may be applied directly to Site Detection block 78. Alternatively, the detection of potential text sites may be improved by first subjecting the output of Binarization block 75 to a Dilation block 76 and Connected Components block 77 (both shown as dash lines) prior to the result being applied to Site Detection block 78. Once the potential text sites have been identified, the potential text site information is passed to Bit Extraction block 79, whose job is to identify any logic 0 bits and logic 1 bits embedded in the text sites (i.e. text character sites).

The presently preferred approach for correcting for text orientation error is divided into two strategic steps, i.e. Strategy 1 (block 101) and Strategy 2 (block 102). Strategy 1 is applied at the Bit Extraction block 79. After bit extraction, the bit stream information is passed from Bit Extraction block 79 to Message Segmentation block 80, which segments the bit stream into discrete messages as determined by detection of the message prefix indicator "A", described above. Following this, Detect Bitstring block 98 determines which detected discrete messages are likely correct and complete. The second strategic block 102 (i.e. Strategy 2) may be applied at this point. After application of Strategy 2 (block 102), the proper text orientation of the document will have been determined, and the complete message "M" (100) may be extracted by error-correction code block (i.e. RCC Decoding block) 99.

Figure 19:
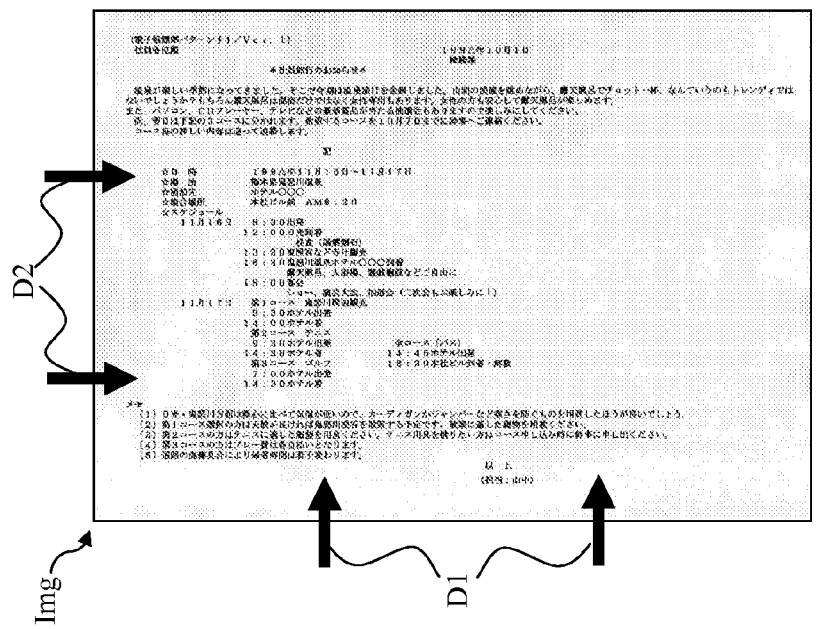
FIG. 19 shows the scanning in multiple directions of an input image.
Figure 18:
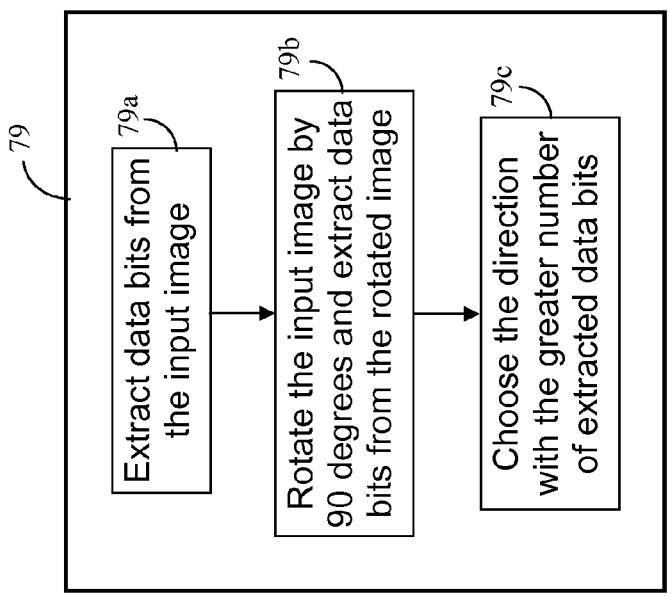
FIG. 18 describes strategy 1 of FIG. 17.

With reference to FIG. 18, strategy 1 is incorporated into Bit Extraction step 79 of FIG. 17, and is broken down into three sub-steps 79a to 79c. The first sub-step is to extract data bits from the input image in its current orientation (sub-step 79a). The input image is then rotated 90 degrees, and data bits are again extracted from the rotated image (sub-step 79b). It is to be understood that the rotating of the input image by 90 degrees is purely a design choice to facilitate the implementation of the present invention since it permits the same bit-extracting mechanism to be used in both sub-steps, 79a and 79b, as is explained below. The main point of this step, as is illustrated in FIG. 19, is to scan the input image Img (i.e. scanned image) in a first direction D1, and to scan the same image Img in a second direction D2, 90° to the first direction. Whether this is achieved by rotating the input image, or rotating the scanning direction, or conducting two simulations scanning operations in two directions is purely a design choice.

The data bit extraction sequences of sub-steps 79a and 79b are a key tool in identifying the orientation of the input image since a correctly oriented image is more likely to result in successful extraction of data bits than an incorrectly oriented image.

Figures 20A, 20B:
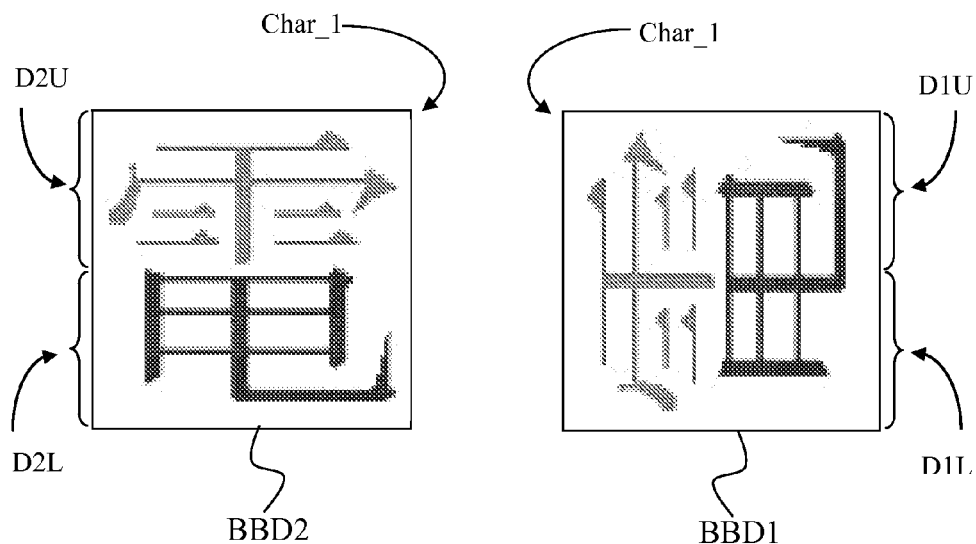
FIGS. 20a and 20b illustrates the difference in effectiveness recovering bit data from a properly oriented text site in FIG. 20a versus an improperly oriented text site in FIG. 20b.

With reference to FIG. 20a, a first character Char_1 as it would appear in a correctly oriented; right-side-up image is shown. In the present example of FIG. 19, second orientation D2 is the correct orientation and first orientation D1 has a 90 degree rotation from the correct orientation. As is explained above, a first step in preparation for extracting data bit information is to identify potential character sites by enclosing theses sites in respective boundary boxes. In FIG. 20a, boundary box BBD2 identifies a sample character site of character Char_1, as it would appear in a scan operation along orientation D2.

As is explained above, data bit extraction is achieved by comparing the brightness levels (i.e. intensity values or average intensity values) of all or a part of the upper and lower regions of the boundary boxes surrounding potential character sites, as identified in Site Detection block 78. If the upper region of a character site is darker than then its lower region by a first predefined threshold value, then the character site is identified as a logic 0 data bit. Alternatively, if the lower region is of a character site is darker than its upper region by a second predefined threshold value, then the character site is identified as a logic 1 data bit. However, if the upper region is not darker than the lower region by the first predefined threshold and the lower region is not darker than the upper region by the second predefined threshold, then data bit extraction fails and the character site is assumed to have no encoded data bit.

In the example of FIG. 20a, the upper region (D2U) of boundary box BBD2 is compared with its lower region, D2L. Since character Char_1 is correctly oriented, an intensity difference between upper region D2U and lower region D2L is readily discernable, and the data bit extraction operation will likely be successful.

However, if the image has a 90 degree rotation, as shown in FIG. 20b, then successful bit extraction is less likely. In FIG. 20b, the same character Char_1 of FIG. 20a is shown with a 90 degree counterclockwise rotation, as viewed along orientation D1 of FIG. 19. As before, a boundary box BBD1 encloses character char_1, but the upper region D1U of boundary box BBD1 now includes both a higher intensity section and a lower intensity section. Similarly, the lower region D1L of boundary box BBD1 likewise includes both a higher intensity section and lower intensity section. If one assumes that an average of all (or a part) of upper region D1U is compared with an average of all (or a part) of lower region D1L to determine which if D1U or D1L is darker (by a predefined firs or second threshold values), then difference in average brightness levels may not be sufficient to permit successful data bit extraction. This is also the case if the brightness level of a predefined section of upper region D1U is compared with a predefined section of lower region D1L. Successful data bit extraction becomes dependent upon the distribution of pixels that define the configuration of character Char_1, and upon the distribution of darkened and lightened pixels. Thus, an improperly oriented character will be less likely to successfully provide a data bit.

It has been found that it may be ten times more likely to successfully extract data bit values from character sites of a correctly oriented image than from character sites of an image having an incorrect 90° or 270° rotation. For example, even if the number of text characters along an image's horizontal text lines is equal to the number of text characters along its vertical text lines, and the image has an equal number of horizontal text lines and vertical text lines, scanning the image along its correct orientation will extract about ten times more data bits than scanning the same image along an incorrect 90° (or 270°) rotation. Stated different, if a text line along its correct orientation yields 200 data bits, then a text line of equal text-length along an incorrect orientation (i.e. 90° or 270° rotation) will generally yield about 20 data bits.

It is to be noted that at this point, no effort has been made to determine if the successfully extracted data bits are decodable into any coherent message, the main point of sub-steps 79a and 79b is purely to extract individual data bits from the character sites.

Continuing with FIG. 18, the number of data bits (i.e. number of logic 1's and logic 0's) successfully extracted in sub-step 79a (i.e. extracted from input image Img in its original orientation) is then compared with the number of data bits successfully extracted in sub-step 79b (i.e. input image Img after having been rotated by 90 degrees). The orientation that renders the greater number of data bits is chosen as the correct orientation (sub-step 79c). For example, if the scanning operation in sub-step 79a renders 20 individual data bits of information, while the scanning operation in sub-step 79b renders 200 individual data bits of information, then the orientation of sub-step 79b (i.e. the resultant image after having rotated input image Img by 90 degrees) is chosen as the correct orientation. Similarly, if sub-step 79a renders more data bits than sub-step 79b, then the orientation of sub-step 79a (i.e. input image Img in its original orientation) is chosen as the correct orientation.

However, one still needs to determine if the input image is right-side-up, or upside-down. This determination is made by incorporating strategy 2 (block 102 in FIG. 17) into Detect Bitstring block 98.

Figure 21:
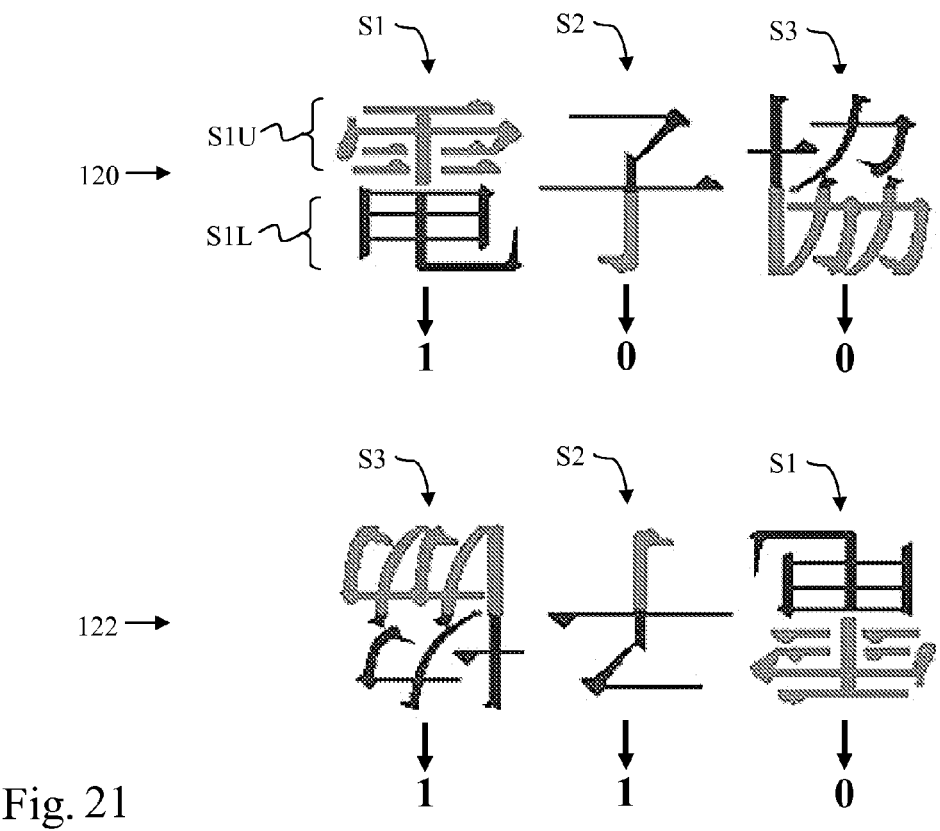
FIG. 21 depicts the recovery of embedded bit data in a character line that is right-side-up and upside down.

With reference to FIG. 21, line 120 shows a sample, right-side-up text excerpt, and line 122 shows the same text excerpt upside-down. Since the present methods for embedded and extracting messages depend on determining which of the upper or lower regions of each embedding site (i.e. text site or boundary box) is darker, turning a text message upside-down does not impede the data bit extracting process, but does introduce error into the extracted data. For example, in the presently preferred embodiment, a logic "0" is represented by having the upper portion of an embedding site be darker than the lower portion by a predefined threshold amount, and a logic "1" is represented by having the lower portion of an embedding site be darker than the upper portion by the same (or by a different) predefined threshold. In sample text line 120, three Japanese text characters (and thus three embedding sites) S1-S3 are shown. The first embedding site 51 has its lower portion S1L darker than its upper portion S1U, and therefore represents a logic 1. The second and third embedding sites S2 and S3 each having their upper portions darker than their lower portions, and thus each represents a logic "0". Therefore, data bit extraction from line 120 from left-to-right would render a data bit sequence of "100".

However, if line 120 were turned up-side-down (i.e. rotated 180 degrees), as illustrated by line 122, then Japanese characters S1-S3 would not only be upside down, but also be in reverse order. To correct for this, the bit extraction sequence should be reversed. If the same bit extraction sequence from left-to-right were applied to line 122, the first two embedding sites S3 and S2 in line 122, would each render a logic "1" since their respective lower portions would now be darker than their respective upper portions, and the third embedding site S1 would render a logic "0" since its upper portion would now be darker than its lower portion. Thus, the bit string extracted from the upside-down text line 122 (from left-to-right) would be "110", which does not match the originally embedded data-bit sequence of "100".

Thus, one needs to identify which orientation is right-side-up in order to correctly extract an embedded data bit message sequence. Currently, three approaches toward solving this problem are contemplated. The first two approaches build on the results of strategy 1 (block 101) incorporated into Bit Extraction block 79, but the third approach may determine the correct orientation of an input scan image without the aid of strategy 1 (block 101). That is, the third approach will continue to extract data correctly even if strategy 1 is omitted from the design flow of FIG. 17, such that no correction is made for the input document being scanned on its side, as is explained more fully below.

The first approach relies on the uniqueness of the predefined indicator prefix "A" in the "AMP" format of the embedded watermarked message. As is explained above, the embedded message "M" preferably consists of a printable text message (including any "blank spaces" that show on a printed media between other text characters), and thus the characters in "M" are printable (text) characters encoded in a bit-code form (such as ASCII format, for example). Additionally, the same embedded watermarked sequence "AMP" is repeated throughout (or through a portion of) the document. The point is that the sequence "AMP" is repeated in order to increase the probability of correctly recovering a complete original message "M".

Prefix indicator "A" is a bit sequence used to identify the beginning of each message sequence "AMP". In the present embodiment, input text message M may be of any length. As is explained below, adding restrictions to input message M facilitates its recovery and decoding. In the preferred embodiment, input text message "M" consists of printable text characters (including "space" characters between words) in a predefined bit-code, and prefix indicator "A" may be made unique from main message "M" by assigning prefix indicator "A" a bit-sequence that includes at least one non-printable character. Alternatively, the prefix indicator "A" may also consist of all printable characters, but the printable characters are preferably selected to be an unusual sequence of text characters (for example, "#*!~?") such that the probability of the same character sequence existing in main message "M" is practically zero.

Assuming that prefix indicator "A" is unique from main message "M", the first approach for determining whether input image Img applied to Detect Bitstring block 98 is right-side up or up-side down consists of extracting the embedded data bit sequence information from the input image in a predefine direction (preferably from left to right). Here, it is assumed that Bit Extraction block 79 has already determined whether the original input image was scanned along its correct orientation, or scanned on its side, and has corrected for any orientation problem.

In the case of FIG. 21, if the image is right-side-up then the text will be arranged as illustrated by line 120, and extracting data from line 120 from left-to-right would render a data bit sequence beginning with "100 . . . ". However, if the image is upside down, then the text will be arranged as illustrated by line 122, and extracting data from line 122 from left-to-right would render a data bit sequence beginning with "110 . . . ".

As a simplified example, if prefix indicator "A" is "1001110100", and assuming that the input image is properly oriented right-side-up, the extracted data sequence from line 120 should start with "A", and repeat itself multiple times, such as "1001110100 . . . 1001110100 . . . 1001110100 . . . ". However, if the input image is oriented upside down, the extracted data sequence from line 122 would still repeat itself, but would not have any occurrences of prefix "A". Thus, if an initial scan for extracting bit information from all or a part (such as the longest text line) of the input image does not find any occurrences of the expected prefix sequence "A", it may be assumed that the input image is upside down, and the input image is subsequently rotated 180 degrees to make it right-side-up. Alternatively, if the initial scan for extracting bit information from all or a part of the input image identifies at least one (and preferably repeated) occurrences of prefix sequence "A", it may be assumed that the input image is right-side-up, and the image does not require any orientation correction.

The second approach for determining whether input image Img applied to Detect Bitstring block 98 is right-side up or up-side down takes into consideration the situation where the bit extraction process from an upside down input image renders prefix "A" purely by chance. Since the embedded message is repeated, this chance occurrence of prefix "A" would be repeated throughout the input image document, and might lead to a "false-positive", i.e. erroneously concluding that a document is right-side-up when it is reality upside down.

To avoid this scenario, the second approach makes use of two bit extraction scans. The first bit extraction is made from left-to-right like in the first approach described above. The second bit extraction scan is then made from right-to-left, and the data bit results from the second extraction are then logically inverted. For example, assume that a right-side-up bit string on an input image is "00001000000001011" from left-to-right, and further assume that this same input image is scanned upside down. The extracted bit string from right-to-left from the upside down input image would render "11110111111110100". The logic inverse of this right-to-left sequence would then recover the original bit string "00001000000001011", which matches the proper message when the input image is right-side-up and bit data is extracted from left-to-right.

Thus, either the first scan from left-to-right will render the true embedded message "AMP" (if the input image is right-side-up), or the second scan from right-to-left followed by logically inverting the logic data value of the data bits will render the true embedded message "AMP" (if the input image is upside down). One therefore only needs to review the results of each scan direction, and determine which scan direction retrieved prefix indicator "A". If only the first scan from left-to-right retrieved any occurrences of prefix indicator "A", then the input image is assumed to be right-side-up. If only the second scan sequence from right-to-left (followed by logic inversion of data bits) retrieved any occurrences of prefix indicator "A", then the input image is assumed to be upside down, and the orientation may be corrected.

However, if both the first left-to-right scan and the second right-to-left scan render occurrences of prefix indicator "A" (purely by chance), then one of three solutions may be implemented to distinguish which scan rendered the true prefix "A".

Figure 22:
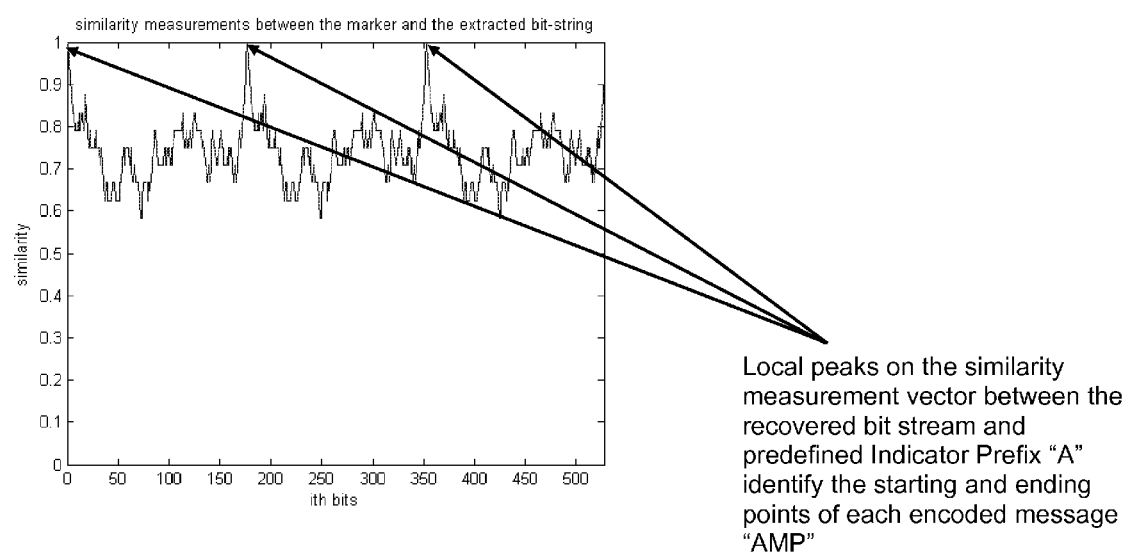
FIG. 22 plots the results of a comparison of a recovered data bit stream with predefined indicator prefix "A", and identifies the peaks.

The first solution to the problem of having occurrences of prefix indicator "A" in both the first and second scans, as illustrated in FIG. 22, determines which of the first and second scans rendered the greater number of occurrences of predefined indicator prefix "A". This can be achieved by comparing a recovered data bit stream with indicator prefix "A". FIG. 22 shows a plotting of a similarity measurement vector indicating the level of bit-similarity between a recovered data bit stream and indicator prefix "A". As shown, a properly scanned input image will repeat encoded message "AMP", which results in multiple local peaks (indicated by arrows) noting the beginning of a current encoded message "AMP" and the beginning of the next repeated message "AMP". Thus, two consecutive local peaks indicate the beginning and ending of a data bit stream segment that constitutes encoded message "AMP".

In the present case where multiple scans in multiple orientations are made, the scan with the greater number of occurrences of indicator prefix "A" is identified as the correct orientation. For example, if the first scan rendered a greater number of occurrences of prefix indicator "A", then the input image is assumed to be right-side-up. Alternatively, if the second scan rendered the greater number of prefix indicator "A", then the input image is assumed to be upside down and orientation correction is implemented (i.e. the input document is rotated 180 degrees).

The second solution to the problem of having occurrences of prefix indicator "A" in both the first and second scans builds on the first solution. In order to make the determination of the correct orientation even more robust, one can examine the number of data bits between repeated occurrences of prefix indicator "A". Since the formatted message AMP is repeated throughout the input image, prefix indicator "A"

should occur at regular intervals within the recovered data bit stream. Thus, the second solution determines which of the multiple scans shows occurrences of prefix indicator "A" at relatively regular intervals (within a predefined deviation percentage, such as 5%, to account for data recovery error). In this case, the scan that shows occurrences of prefix at regular intervals will be elected as the correct orientation, even if this same scan does not the most occurrences of prefix indicator "A" among all the scans. For example in the illustrative implementation described immediately above, if the first scan (i.e. the input image in its original orientation) had more occurrences of prefix indicator "A" than the second scan (i.e. the input image after a 90° rotation), but the second scan showed a relatively fixed number of data bits (i.e. within an error of 5%, for example) between its occurrences of prefix indicator "A" while the first scan showed no regularity in the occurrences of its prefix indicator "A", then the second scan would be identified s the correct orientation.

The third solution to the problem of having occurrences of prefix indicator "A" in both the first and second scans adds a restriction to input message M in order to increase the robustness of the determination of the correct orientation. In this third solution, it is assumed that bit-length of input message M is known a priory. For example, the bit length of input message M (and formatted message AMP) may be previously defined and made fixed. Thus like in the second solution, this third solution also takes into account the number of data bits between repeated occurrence of prefix indicator "A" in the first and second scans. However, in this third solution, it is assumed that the bit-length of an encoded message "AMP" is fixed and predefined. If an input message "M" is too short for the allotted, fixed bit-length, then extra characters (such as repeated space characters " " or some other predefined character) may be used to pad the length of input message "M" up to the required length. In this third solution, since the length of encoded message "AMP" is known, the bit-length between repeated occurrences of prefix indicator "A" in each of the first and second scans may be compared to the predefined bit-length of formatted message AMP. The scan whose bit-length between repeated occurrences of prefix indicator "A" matches most closely the predefined bit-length of original encoded message "AMP" is selected as the correct scan. Thus, if the bit-length of the recovered message in the first scan matches the predefined bit-length of "AMP", then the input image is assumed to be right-side-up and no further orientation correction is required. Alternatively, if the bit-length of the recovered message in the second scan (and data bit inversion) matches more closely the predefined bit-length of "AMP", then the input image is assumed to be upside down and the image is corrected for proper orientation (i.e. it is turned 180 degrees).

The third approach for determining whether input image Img applied to Detect Bitstring block 98 is right-side up or up-side down repeats the left-to-right scan of the first approach, described above, four times with the input image being rotated 90 degrees between scans (as is illustrated in FIG. 16). Assuming that the input image has not been corrected for being on its side (i.e. the strategy 1 of block 101 was not implemented), then the input image may have one of four possible orientations 91-94, as shown in FIG. 16. The input image may be scanned from left-to-right for data bit extraction, and then rotated 90 degrees. The same left-to-right scan for data bit extraction is applied to the resultant image, and the image is again rotated 90 degrees (i.e. total of 180 degrees from the original orientation). The same left-to-right scan for data bit extraction is applied to the resultant image, and the image is again rotated 90 degrees (i.e. total of 270 degrees from the original orientation). The resultant image is then scanned from left-to-right for data bit extraction one last time. Since the input image was cycled through all four possible orientations, only one of the scans would have been applied to a correctly orientated, right-side-up version of the input image. Thus, only one of the scans would have rendered any occurrence of unique prefix indicator "A" (if "A" is assumed to be unique from input message "M"). The scan that rendered the occurrence(s) of prefix indicator "A" is identified as the proper, right-side-up, orientation for the input image.

If prefix indicator "A" is not unique from input message "M", and more than one of the four scans in this third approach render occurrence(s) of prefix indicator "A", then any of the above-described first, second, or third solutions to the problem of having occurrences of prefix indicator "A" in multiple scans (i.e. both the first and second scans) may be applied to this third approach for determining whether input image Img applied to Detect Bitstring block 98 is right-side up or up-side down. That is, whichever of the four scans ($1^{st}$, $2^{nd}$, $3^{rd}$ or $4^{th}$) along any of the four 90°-shifted orientations identifies the greatest number of occurrence of "A" (irrespective of the bit-length of M) is identified as being the correct orientation. Alternatively, which ever of the four scans rendered occurrences of prefix indicator "A" at relatively regular intervals (within a 5% margin of error, for example) is identified as the correct orientation. Still alternatively, if the bit-length of input message "M" is fixed and predefined, then the scan whose recovered bit-length for "M" between repeated occurrences of "A" most closely matches the predefined bit-length of "M" is identified as being the correct orientation.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A processing unit for recovering an embedded message within an input image, comprising:
   (i) an input for receiving said input image having logic data bit information encoded into characters within said input image;
   (ii) a site detection unit for identifying characters within said input image;
   (iii) a bit extraction unit for extracting logic data bit information from said characters to define a working set of logic bits;
   (iv) a detect bitstring unit for:
      (1) conducting a first search operation on said working set of logic bits for occurrences of a predefined indicator prefix bit-sequence;
      (2) reversing the bit order of said working set of logic bits and logically inverting each bit to create an inverse set of logic bits;
      (3) conducting a second search operation on said inverse set of logic bits for occurrences of said predefined indicator prefix bit-sequence; and
      (4) identifying a true set of logic bits based on the results of said first and second search operations; and
   (v) a decoding unit for converting said true set of logic bits to characters according to a predefined decoding scheme.

2. The processing unit of claim 1, wherein said bit extracting unit:
   (A) extracts a first set of logic bits from the input image in the input image's original orientation;
   (B) extracts a second set of logic bits from said input image along an orientation 90 degrees to the input image's original orientation; and
   (C) if the number of logic bits in said first set of logic bits is greater than the number of bits in said second set of logic bits, then identifies said first set of logic bits as said working set of logic bits, else identifies said second set of logic bits as said working set of logic bits.

3. The processing unit of claim 1, wherein in said input image,
   (a) each of said characters is divided into a first part and a second part;
   (b) a first logic data bit is encoded by having pixels within said first part be darker than pixels within said second part by a first predefined threshold amount;
   (c) a second logic data bit is encoded by having pixels within said first part be lighter than pixels within said second part by a second threshold amount, said second logic data bit being the logic compliment of said first logic data bit; and
   said bit extraction unit extracts logic data bit information from said characters by determining, for each character checked, if pixels within said first part are darker than pixels within said second part by said first predetermined threshold amount, or if pixels within said first part are lighter than pixels within said second part by said second threshold amount.

4. The processing unit of claim 3, wherein said first threshold amount is equal to said second threshold amount.

5. The processing unit of claim 1, wherein in part (4) of said detect bitstring unit, if the number of occurrences of said predefined indicator prefix bit-sequence found in said first search operation is greater than the number of occurrences found in said second search operation, then said working set of logic bits is identified as said true set of logic bits, else said inverse set of logic bits is identified as said true set of logic bits.

6. The processing unit of claim 1, wherein in said detect bitstring unit:
   if the number of data bits between repeated occurrences of said predefined indicator prefix in said working set of logic bits matches a predefined message bit-size, then part (4) identifies said working set of logic bits as said true set of logic bits; and
   if the number of data bits between repeated occurrences of said predefined indicator prefix in said inverse set of logic bits match said predefined message bit-size, then part (4) identifies said inverse set of logic bits as said true set of logic bits.

7. The processing unit of claim 1, wherein in said detect bitstring unit:
   said first search operation identifies a first message-length value as the number of bits between repeated occurrences of said predefined indicator prefix within said working set of logic bits;
   said second search operation identifies a second message-length value as the number of bits between repeated occurrences of said predefined indicator prefix within said inverse set of logic bits; and
   if said first message-length value is closer than said second message-length value to a predefined message bit-size, then part (4) identifies said working set of logic bits as said true set of logic bits, else part (4) identifies said inverse set of logic bits as said true set of logic bits.

8. The processing unit of claim 1, wherein said predefined indicator prefix bit-sequence is unique from the remaining bit sequence in said embedded message.

9. The processing unit of claim 1, said embedded message includes an input message "M" consisting of only printable characters, and said predefined indicator prefix bit-sequence includes at least one non-printable character.

10. The processing unit of claim 1, wherein said bit extraction unit:
    extracts a first set of logic bits from a 0-degree rotation of said input image;
    extracts a second set of logic bits from a 90-degree-rotation of said input image;
    extracts a third set of logic bits from an 180-degree-rotation of said input image; and
    extracts a fourth set of logic bits from a 270-degree-rotation of said input image.

11. The processing unit of claim 10, wherein said processing unit identifies as a correct orientation for the input image whichever of said 0-degree-rotation of said input image, 90-degree-rotation of said input image, 180-degree-rotation of said input image, or 270-degree-rotation of said input image that corresponds to the first, second, third, or fourth set of logic bits that is identified as said true set of logic bits.

12. The processing unit of claim 10, wherein in said detect bitstring unit, said conducting a first search operation on said working set of logic bits for occurrences of a predefined indicator prefix bit-sequence includes:
    conducting a first seek operation to search said first set of logic bits for occurrences of said predefined indicator prefix bit-sequence;
    optionally conducting a second seek operation to search said second set of logic bits for occurrences of said predefined indicator prefix bit-sequence;
    optionally conducting a third seek operation to search said third set of logic bits for occurrences of said predefined indicator prefix bit-sequence; and
    optionally conducting a fourth seek operation to search said fourth set of logic bits for occurrences of said predefined indicator prefix bit-sequence.

13. The processing unit of claim 12, wherein:
    if said first seek operation finds at least one occurrence of said predefined indicator prefix bit-sequence, then said detect bitstring unit skips said second, third and fourth seek operations;
    else if said second seek operation finds at least one occurrence of said predefined indicator prefix bit-sequence, then said detect bitstring unit skips said third and fourth seek operations;
    else if said third seek operation finds at least one occurrence of said predefined indicator prefix bit-sequence, then said detect bitstring unit skips said fourth seek operation;
    else said detect bitstring unit implements said fourth seek operation.

14. The processing unit of claim 12, wherein said detect bitstring unit implements each of said first, second, third, and fourth seek operations, and determines a respective first, second, third, and fourth message-length value indicative of the number of data bits between repeated occurrences of said predefined indicator prefix bit-sequence in each of said first, second, third, and fourth seek operations, and identifies which of said first, second, third, and fourth message-length values is closes to a predefined message bit length.

* * * * *